(12) United States Patent
Baun et al.

(10) Patent No.: US 12,006,911 B2
(45) Date of Patent: Jun. 11, 2024

(54) NACELLE FOR A WIND TURBINE

(71) Applicant: Vestas Wind Systems A/S, Aarhus (DK)

(72) Inventors: Torben Ladegaard Baun, Skødstrup (DK); Jens-Jørgen Hansen, Højbjerg (DK); Renato Catroga, Egå (DK); Jesper Lykkegaard Neubauer, Hornslet (DK)

(73) Assignee: Vestas Wind Systems A/S, Aarhus N. (DK)

( * ) Notice: Subject to any disclaimer, the term of this patent is extended or adjusted under 35 U.S.C. 154(b) by 85 days.

(21) Appl. No.: 17/774,192

(22) PCT Filed: Nov. 23, 2020

(86) PCT No.: PCT/DK2020/050324
§ 371 (c)(1),
(2) Date: May 4, 2022

(87) PCT Pub. No.: WO2021/098932
PCT Pub. Date: May 27, 2021

(65) Prior Publication Data
US 2022/0349383 A1    Nov. 3, 2022

(30) Foreign Application Priority Data
Nov. 22, 2019    (DK) .......................... PA 2019 70713

(51) Int. Cl.
*F03D 13/10*    (2016.01)
*F03D 80/00*    (2016.01)
(Continued)

(52) U.S. Cl.
CPC ........... *F03D 13/10* (2016.05); *F03D 13/122* (2023.08); *F03D 80/003* (2023.08); *F03D 80/50* (2016.05);
(Continued)

(58) Field of Classification Search
CPC .......... F03D 13/10; F03D 80/50; F03D 80/60; F03D 80/80; F03D 80/88; F05B 2240/142; F05B 2240/14; Y02B 10/30
See application file for complete search history.

(56) References Cited

U.S. PATENT DOCUMENTS 3,276,169 A * 10/1966 Porter ..................... B24B 31/06
366/110
10,352,306 B2 * 7/2019 Baun ....................... F03D 15/00
(Continued)

FOREIGN PATENT DOCUMENTS

DE        10013442 C1    10/2001
EP         1134410 A1     9/2001
(Continued)

OTHER PUBLICATIONS

Danish Patent and Trademark Office, Search and Examination Report in PA 2019 70713, May 6, 2020.
(Continued)

*Primary Examiner* — Bayan Salone
(74) *Attorney, Agent, or Firm* — Wood Herron & Evans LLP

(57) ABSTRACT

A wind turbine nacelle configured for mounting on a wind turbine tower and for supporting a rotor-supporting assembly, the nacelle comprising a main unit, and at least two auxiliary units. To increase flexibility and improve assembly and maintenance procedures of the wind turbine, the auxiliary unit comprises at least two auxiliary units each accommodating at least one wind turbine component, e.g. a converter or a transformer. The auxiliary units are attached individually to the same wall of the main unit, e.g. to a side wall or a rear wall.

22 Claims, 15 Drawing Sheets

(51) Int. Cl.
*F03D 80/50* (2016.01)
*F03D 80/60* (2016.01)
*F03D 80/80* (2016.01)

(52) U.S. Cl.
CPC ........... *F03D 80/60* (2016.05); *F03D 80/601* (2023.08); *F03D 80/80* (2016.05); *F03D 80/821* (2023.08); *F03D 80/85* (2016.05); *F03D 80/88* (2016.05); *F03D 80/881* (2023.08); *F05B 2230/61* (2013.01); *F05B 2240/14* (2013.01); *F05B 2240/142* (2013.01)

(56) References Cited

U.S. PATENT DOCUMENTS

| | | | | |
|---|---|---|---|---|
| 11,274,657 | B2* | 3/2022 | Mortensen | F03D 13/10 |
| 2017/0022979 | A1* | 1/2017 | Teichert | B66B 9/00 |
| 2017/0314535 | A1* | 11/2017 | Mortensen | F03D 13/10 |

FOREIGN PATENT DOCUMENTS

| | | | | |
|---|---|---|---|---|
| EP | 2412970 | A1 | 2/2012 | |
| EP | 2550453 | A2 | 1/2013 | |
| EP | 2550453 | B1 * | 4/2014 | ........... B66C 23/207 |
| EP | 3247899 | A1 | 11/2017 | |
| EP | 3276169 | A1 * | 1/2018 | |
| EP | 3276169 | A1 | 1/2018 | |
| EP | 3247899 | B1 * | 10/2018 | ............ B65D 85/68 |
| WO | 2011117005 | A2 | 9/2011 | |
| WO | WO-2011117005 | A2 * | 9/2011 | ............ B66C 23/207 |

OTHER PUBLICATIONS

European Patent Office, International Search Report and Written Opinion in PCT Application No. PCT/DK2020/050324, Feb. 9, 2021.

* cited by examiner

NACELLE FOR A WIND TURBINE

INTRODUCTION

The present disclosure relates to a nacelle for a wind turbine. The nacelle comprises a main unit and at least two auxiliary units mounted on a wall of the main unit. The nacelle of the present disclosure is particularly suitable for use in large wind turbines. The disclosure further relates to a wind turbine with the nacelle and to a method for erecting a wind turbine comprising such a nacelle.

BACKGROUND

Wind turbines increase in size in terms of nominal power output as well as in terms of physical dimensions of the individual parts of the wind turbine. Therefore, the size of the nacelle must also be increased to accommodate the required wind turbine components. Wind turbines are normally transported from the location or locations of manufacture of the individual parts to the operating site where the wind turbine is erected.

SUMMARY

It is an object of embodiments of the disclosure to facilitate further modularity, ease of design and manufacturing, and allow for improved maintenance of wind turbines. It is a further object of embodiments of the disclosure to provide a nacelle which is transportable using ordinary transport means and to lower transportation and handling costs without limiting the possible size of the nacelle.

According to these and other objects, the disclosure provides a wind turbine nacelle configured for mounting on a wind turbine tower and housing a rotor-supporting assembly defining a rotational axis.

The nacelle comprises:
- a main unit arranged to be connected to a wind turbine tower and housing the rotor-supporting assembly, the main unit comprising a first side wall and a second side wall on opposite sides of the rotational axis and a rear wall extending transverse to the rotational axis between the side walls, and
- at least two separate auxiliary units, wherein
the main unit and a first of the at least two auxiliary units are assembled at a first interface,
the main unit and a second of the at least two auxiliary units are assembled at a second interface, and
both the first and the second interface are in a first wall.

The first wall could be the first side wall, the second side wall, or the rear wall of the main unit.

Since both interfaces are in the same wall selected between the first side wall, the second side wall, and the rear wall, exchange of control signals, power, personel, or spare parts etc., between the main unit and the auxilary units can be communicated through the same wall, i.e. throuhg that first or second side wall or through the rear wall, which thereby facilitates an improved layout etc.

The main unit may be considered as the central part of the nacelle. The main unit may be arranged to be connected to a wind turbine tower via a yawing arrangement. Accordingly, it may comprise at least a part of the yawing arrangement. Additionally, it may house the rotor-supporting assembly. Particularly, the main unit may include the main frame to allow the forces from the rotor and drivetrain to be directed down into the tower via the yawing arrangement.

In a wind turbine where the main unit houses the rotor-supporting assembly, the auxiliary unit or units may typically house a plurality of different wind turbine components. The separation of the auxiliary unit into at least two auxiliary units allows different suppliers to supply different separate units. This allows the packaging and logistic during transport of the at least one components to be carried out by separate suppliers, and at the site of construction of the wind turbine, each supplied auxiliary unit with its at least one component can be assembled with the main unit to define the nacelle. During the entire shipping and assembly procedure, the at least one component may remain encapsulated in the auxiliary unit, and optimal protection of the at least one component may therefore be provided throughout the shipping and assembly procedure.

Particularly, in areas where the at least one component may be soiled by dirt, rain, water, or sand etc., the continuous encapsulation and use of the at least one component in an auxiliary unit forming part of the final nacelle offers potentially an increased lifetime and a reduced mall functioning. The number of shifts in responsibility may also be reduced since the supplier may remain responsible for the at least one component and the auxiliary unit throughout the shipping and assembly procedure e.g. until a seal into the auxiliary unit is broken and the at least one component is connected to other wind turbine components housed in other auxiliary units or in the main unit.

Particularly, different wind turbine components can be delivered in sealed auxiliary units, and the seal may remain intact until the auxiliary units are assembled with the main unit to form part of the nacelle. In a final assembly state, e.g. where all wind turbine components are installed in the nacelle, and the nacelle is in place on the tower, the sealed auxiliary unit may be opened and connections between the different wind turbine components may be established. Until this moment, the encapsulation of the at least one component in the auxiliary unit is in the state provided by, and optionally controlled by the supplier.

The auxiliary and/or the main units may be formed with size and/or the outer shape comparable to, or equal to, the size and shape of a shipping freight container. Each unit thereby inherits the advantages of shipping freight containers with respect to handling, transportation, and storage. Shipping freight containers can for example be handled anywhere in the world by ship, train, and truck etc. and at lower costs compared to bulk transport.

The cost savings are even more pronounced by shipping freight containers constituting the units. A shipping freight container is also referred to as an intermodal container, a standard freight container, a box container, a sea fright container, or an ISO container, and refers in general to a container used to store and move materials and products in the global containerized intermodal freight transport system for intercontinental traffic. The shipping freight container may follow the dimensional and structural specifications in the ISO standard of ISO 668:2013 for series 1 freight containers.

In one embodiment, the nacelle comprises two auxiliary units each having half the size of one shipping freight container following the dimensional and structural specifications in the ISO standard of ISO 668:2013 for series 1 freight containers, and arranged such that the two half parts of the container can be assembled to one container during transport, and split into two auxiliary units. The container may particularly be split in an interface extending in the longitudinal direction of the container, i.e. the longest direction of the container.

The nacelle may be carried either directly by the tower, or indirectly via intermediate tower structures. If the wind turbine is of the traditional horizontal axis type, the nacelle is typically carried by a yawing arrangement directly between the tower top and the nacelle. The disclosure may, however, also relate to a multiple rotor wind turbine of the kind where more than one nacelle are carried by a transverse beam structure which is again carried by the tower.

The disclosure may relate to an upwind wind turbine or to a downwind wind turbine.

The main unit is the part connecting the nacelle to the tower, either directly or indirectly via said intermediate tower structure or structures. The main unit may house parts of the drivetrain such as at least a part of the rotor shaft.

The wind turbine could be a direct drive wind turbine with the generator typically placed outside the nacelle, or the wind turbine could be with the generator located e.g. in the main unit. The main unit supports the rotor via the rotor shaft.

The main unit may, depending on the type of wind turbine, comprise further parts, e.g. a gear box, a bearing system and different kinds of peripheral equipment, e.g. for lubrication, cooling, and control purpose. The main unit may particularly comprise a main frame connecting the drivetrain and the tower or intermediate tower structure, e.g. via a yawing arrangement. The main frame may particularly be a casted component.

The mainframe may be rotatable relative to the tower via a yawing arrangement. This may either be facilitated by connecting the main frame to the tower via the yawing arrangement, or by connecting at least two main frames of individual nacelle structures to a tower via said intermediate tower structure which is again joined to the tower via a yawing arrangement.

In further embodiments, auxiliary units are arranged along both side walls or along a rear wall and one or both side walls.

Accordingly
the main unit and a third of the at least two auxiliary units may be assembled at a third interface,
the main unit and a fourth of the at least two auxiliary units may be assembled at a fourth interface, and
both the third and the fourth interfaces may be in a second wall.

The first wall and the second walls being different walls each being one of the first side wall, the second side wall, or the rear wall of the main unit.

Additionally:
the main unit and a fifth of the at least two auxiliary units may be assembled at a fifth interface,
the main unit and a sixth of the at least two auxiliary units may be assembled at a sixth interface, and
both the fifth and the sixth interfaces may be in a third wall of the first side wall, the second side wall, and the rear wall of the main unit.

The first wall could be the first side wall, the wall could be the second side wall, and the third wall could be the rear wall.

The first and second interface could e.g. be at a side wall on the right side, the third and fourth interface could be at a side wall on the left side, and the fifth and sixth interface could be at the rear wall.

The auxiliary units extending along the rear wall may be connected to the main unit or to the auxiliary units which extend along the side walls or they may be connected both to the main unit and to the auxiliary units extending along the side walls.

Accordingly:
the first auxiliary unit and a seventh of the at least two auxiliary units could be assembled at a seventh interface,
the second auxiliary unit and an eighth of the at least two auxiliary units could be assembled at an eighth interface,
the third auxiliary unit and the seventh auxiliary units could be assembled at a ninth interface, and
the fourth auxiliary unit and the eighth auxiliary units could be assembled at a tenth interface.

The first wall could be the first side wall, the second wall could be the second side wall, and both the seventh auxiliary unit and the eighth auxiliary unit could extend along the rear wall.

In addition to the ninth and tenth interfaces, the main unit and the seventh auxiliary unit could be assembled at an eleventh interface, and the main unit and the eighth auxiliary unit could be assembled at a twelfth interface.

The interfaces are mentioned to be at, or in the walls, but the load of the auxiliary units could be carried by a more rigid structure at the walls or within the main unit, e.g. a main frame of the nacelle which is arranged to carry the rotor-assembly and transfer the load of the rotor assembly into the tower.

The first, second, third, fourth, fifth, sixth, seventh, eighth, ninth, tenth, eleventh, or twelfth interface, in the following simply referred to as "one of the interfaces" may be suitable for allowing release of the auxiliary unit from the main unit after the main unit is assembled on the tower top. For that purpose, the interfaces may comprise mutually interlocking structural features on the main unit and on the auxiliary unit. Examples of such mutually interlocking features may be protrusions on one of the main and auxiliary unit and indentations or holes on the other one of the main and auxiliary unit, the first interface may be a bolted interface allowing releasable joining of the main and auxiliary units, or the auxiliary unit may be held in place on the main unit by cables by which the auxiliary unit can be lowered to the ground for service, replacement of components or for transport of components and personnel between ground and the nacelle.

In one embodiment, the interfaces may be configured such that the auxiliary unit can be received by the main unit or by other auxiliary units when the auxiliary unit is moved vertically in close vicinity to the main unit. Such an interface may be constituted by hooks or an upwardly and outwardly projecting track on at least one of the main and auxiliary units.

At least one of the first, third, fifth, and seventh auxiliary unit forms an upper unit and at least one of the second, fourth, sixth, and eighth auxiliary unit forms a lower unit arranged below the upper unit and aligned therewith in a vertical row. In this embodiment, the lower unit may particularly be considered for at least one components needing frequent maintenance or replacement, and the second interface may include cables by which the upper auxiliary unit can be lowered to the ground for service, replacement of components, or for transport of components and personnel between ground and the nacelle.

The lower unit may also be considered for at least one component imposing a higher safety risk, and by the lower location, it may be released and send to the ground in case of fire etc.

The upper unit may form a roof for the lower unit meaning that the upper surface of the lower unit is covered by a lower surface of the upper unit. For that purpose, the lower unit and the upper unit may have identical shapes and/or sizes when seen in a horizontal cross section. The lower and upper units may be similar units, and they may have similar or identical content. They may e.g. both contain a transformer and a converter.

In one embodiment, the upper and lower units are attached individually to the main unit. In this embodiment, the interfaces interact with each auxiliary unit individually. In another embodiment, the upper and lower units are assembled in further interfaces. The further interfaces may be particularly suitable for allowing release of one of the upper and lower auxiliary unit from the other one of the upper or lower unit. For that purpose, the further interfaces may comprise mutually interlocking structural features on the auxiliary units. Examples of such mutually interlocking features may be protrusions on one of the auxiliary units and indentations or holes on the other one of the auxiliary units. The further interfaces may be a bolted interface allowing releasable joining of the auxiliary units from each other, or the auxiliary units may be joined by cables by which the one auxiliary unit can be lowered to the ground for service, replacement of components or for transport of components and personnel between ground and the nacelle. In one embodiment, the further interfaces are configured such that one auxiliary unit can be received by another auxiliary unit when the auxiliary unit is lowered in close vicinity to the other auxiliary unit. Such an interface may be constituted by hooks or an upwardly and outwardly projecting track on at least one of one or both of the auxiliary units being joined by a further interface.

The upper unit and the lower unit may have a total height which is between 80 and 120 percent of a height of the main unit.

Both the main unit and the auxiliary units may have wall parts facing each other to provide a double-sided wall structure in the interface between the main unit and an auxiliary unit.

A gap may be defined between the auxiliary units and the main unit and/or between two auxiliary units.

In one embodiment, there is a gap between the auxiliary units and the main unit, in one embodiment there is a gap between only one of the auxiliary units and the main unit, in one embodiment, there is a gap between the two auxiliary units, and in one embodiment there is a gap between the auxiliary units and between the auxiliary units and the main unit. The gap may allow air to pass between the main and auxiliary units or between the auxiliary units and can thereby increase safety by preventing fire spreading or thermal convection between the units between which there is a gap. The gap may further increase cooling in the units.

An entrance may be defined from the main unit to at least one of the auxiliary units, and/or from one auxiliary unit to the other auxiliary unit. The nacelle may comprise a gasket sealingly engaging two auxiliary units or an auxiliary unit and a main unit to form a sealing engagement between the engaged parts.

The gasket around an entrance from a main unit to an auxiliary unit may particularly engage a wall of both the main unit and the auxiliary unit, and a gasket around an entrance from an auxiliary unit to an auxiliary unit may particularly engage a wall of both auxiliary units.

Each auxiliary unit may form an interior space which can be separated completely from a space in the main unit and/or from a space in the other auxiliary unit. For that purpose, the auxiliary units may comprise suitable sealing means for sealing any opening, e.g. openings around cables or pipes extending from the main unit into an auxiliary unit or extending between two auxiliary units.

The auxiliary units may accommodate at least one component which interacts with a wind turbine component in the main unit. The interaction may include electrical communication of signals or power or by communication of cooling or lubrication fluid.

The nacelle may house a power conversion assembly arranged to convert the power from the generator into a desired energy form. The power conversion assembly may be configured for delivering either electrical power, e.g. in AC or DC, or for converting electrical power from the generator into other forms of energy, e.g. into hydrogen, ammonia, or methanol.

In case of electrical energy, the power conversion assembly may be configured for linking the generator e.g. to an external power grid. In that case, the power conversion assembly may be constituted e.g. by a converter, a transformer, and a switch gear. Any such components may be comprised in the power conversion assembly.

The generator may, as an example, be an asynchronous or synchronous generator, e.g. an asynchronous or synchronous generator, and the converter voltage may be in same range as a generator voltage, sometimes referred to as Stator voltage.

The generator, in another example, may be a doubly fed induction generator (DFIG). In that case, the voltage on the converter could be different from the Generator stator voltage. The converter is connected to generator rotor and is normally the same voltage or a lower voltages than the stator voltage.

Low voltage may e.g. be considered as voltages up to 1000 V. Medium voltage may be considered as voltages of 1 KV to about 60 kV. The generator Voltage could be low voltage, or medium voltage.

In a wind turbine configured for producing hydrogen, ammonia, or methanol, the power conversion assembly may comprise an electrolysis cell configured for generating the substance based on electrical power from the generator.

In other embodiments, the wind turbine may store energy, and the power conversion assembly may comprise a battery.

The nacelle and particularly one or more of the auxiliary units may house an operative component e.g. selected from the group consisting of: a transformer, a converter, a battery, and a fuel-cell. Accordingly, the auxiliary unit may comprise an outer surface facing towards the main unit and including an interface for electrical or fluid communication facilitating such operative components.

In a corresponding manner, one, or each of the auxiliary units may accommodate an operative component which interacts with a wind turbine component in another auxiliary unit. The operative component in one auxiliary unit may e.g. be selected from the group consisting of: a transformer, a converter, a battery, and a fuel-cell. Accordingly, the auxiliary unit may comprise an outer surface facing towards another auxiliary unit and including an interface for electrical or fluid communication and facilitating these specific components.

The operative component in one auxiliary unit may have a function being identical to a function of an operative component in another auxiliary unit. This provides a double function where different components are dedicated to identical functions. One of the two identically functioning components may be contained in one of the auxiliary unit and the other component may be contained in another auxiliary unit.

In case of failure, the wind turbine may continue operational on reduced power while the operative component in one of the auxiliary units is replaced, e.g. by replacing the entire auxiliary unit.

At least one auxiliary unit may accommodate an operative component which is suspended directly on the main unit.

The nacelle may include a system for automatic release of at least one of the auxiliary units. This feature may be used e.g. in case of fire, where one unit may be released to prevent spreading of fire. The released unit may e.g. by lowered in a controlled manner to the ground by a cable structure including an automatic braking mechanism preventing to high lowering speed. In one embodiment, one or more of the auxiliary units are fixed to the main unit by bolts which include an explosion-based release mechanism and fixed by cables on a winch with a braking coupling preventing reeling speeds above a certain limit. In case of fire in the auxiliary unit, the bolts are destroyed, and the auxiliary unit falls to ground controlled by the cables. Accordingly, the automatic release may include various means for automatically releasing the unit including power driven hooks, explosion bolts, speed dampened cables for lowering the unit etc.

In one embodiment, vibration dampening material is arranged between the main unit and the auxiliary unit. Rubber or foam material, or material with a similar elastically deformable and vibration dampening effect may be used. The dampening material may particularly be compressed between the main unit and the auxiliary unit and it may particularly be arranged where the main unit and the auxiliary unit are fixed by nails, rivets, bolts or any similar mechanical attachment.

In one embodiment, the main unit is broader than the auxiliary unit(s). That the main unit is "broader" means that its dimension in a horizontal plane, and perpendicular to the rotational axis is larger than the same dimension of the auxiliary unit(s). The main unit may particularly be broader than a shipping freight container following the dimensional and structural specifications in the ISO standard of ISO 668:2013 for series 1 freight containers, whereas the auxiliary unit(s) may have the size of, or be smaller than what is specified for those ISO standard, ISO 668:2013, series 1 freight containers.

In a second aspect, a method of making a nacelle for a wind turbine is provided. The method comprises receiving at least two wind turbine components each being in an auxiliary unit. The two auxiliary units are joined while the components are in the auxiliary units. The auxiliary unit are attached to a main unit and the main unit is attached to a wind turbine tower. The main unit may be attached to the wind turbine tower before or after the auxiliary units are attached to the main unit, and the auxiliary units may be joined one by one to the main unit or they may be assembled with the main unit joined, e.g. in sets of two auxiliary units.

Particularly, it may be an advantage to ship two components in individual auxiliary units, assemble the auxiliary units at or near the place where the wind turbine is erected to define an auxiliary unit, and assembling the main and auxiliary unit, e.g. on top of the tower.

The auxiliary units may be sealed and electronic alarms, i.e. based on unintended intrusion or undesired temperatures, water, or humidity may be provided.

The auxiliary units may be arranged to hermetically isolate one of the two wind turbine components from the other one of the two wind turbine components. Such a hermetic isolation in one selected auxiliary unit may have several advantages. One auxiliary unit may be hermetic, whereas an adjacent could be open and thereby allow swift pressure reduction e.g. in case of fire.

The auxiliary units may be arranged to hermetically isolate at least one of the two wind turbine components from wind turbine components in the main unit and or from wind turbine components in the other auxiliary units.

One auxiliary unit may be released from the other auxiliary unit and from the main unit in response to an incident such as fire etc.

LIST OF DRAWINGS

In the following, embodiments of the disclosure will be described in further details with reference to the drawing in which.

Figure 19A:
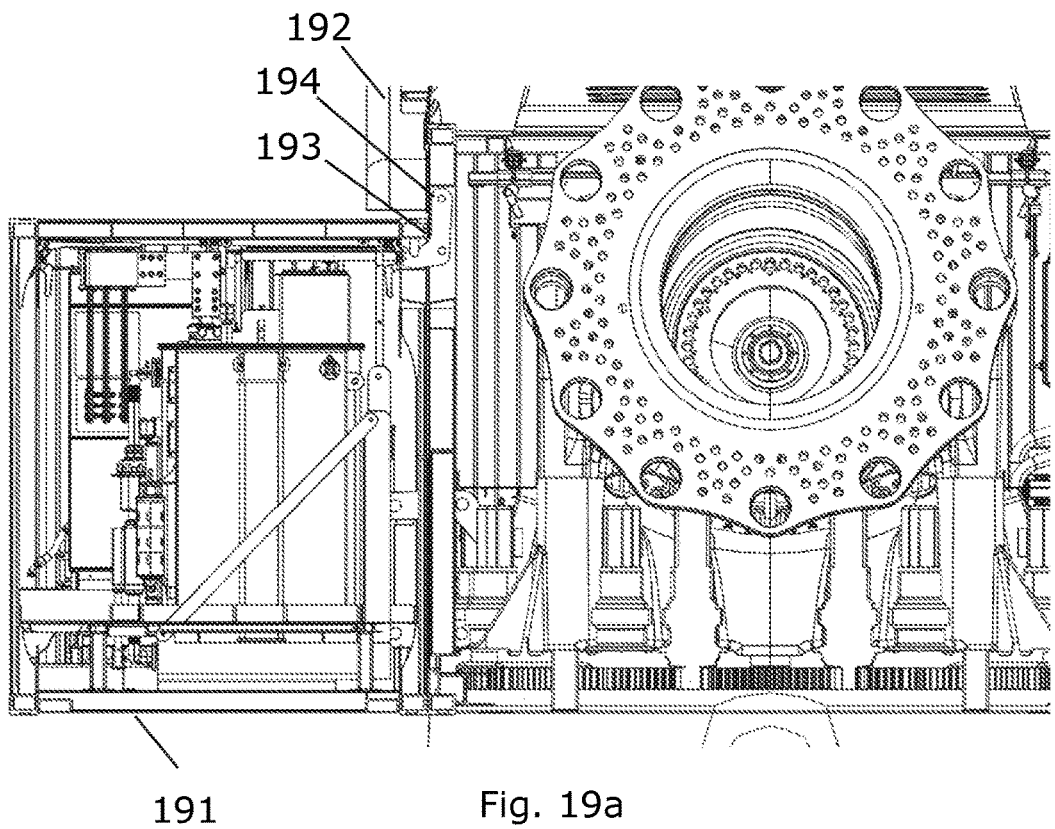
Figure 19B:
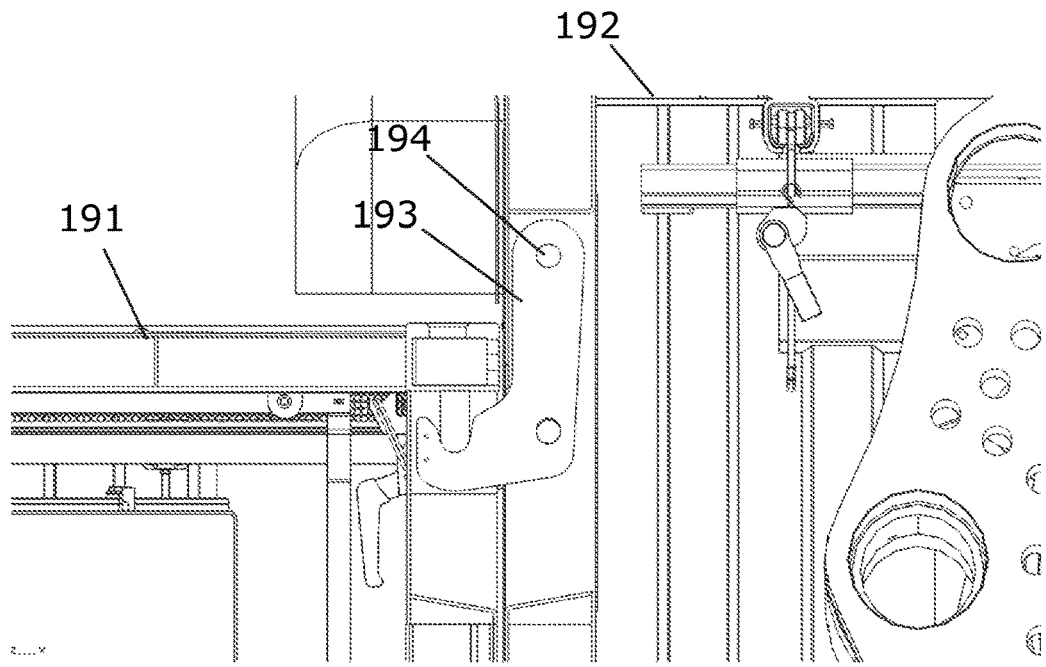
Figure 19C:
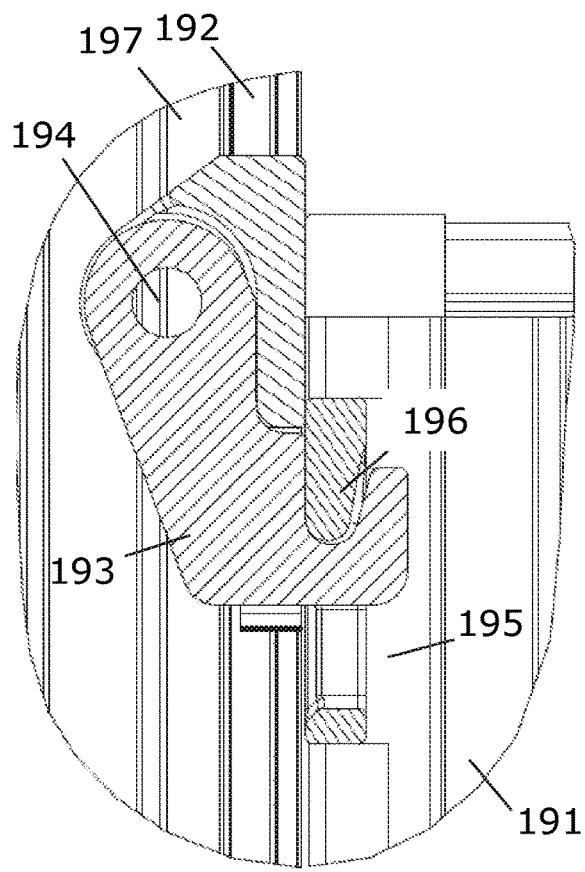
Figure 21:
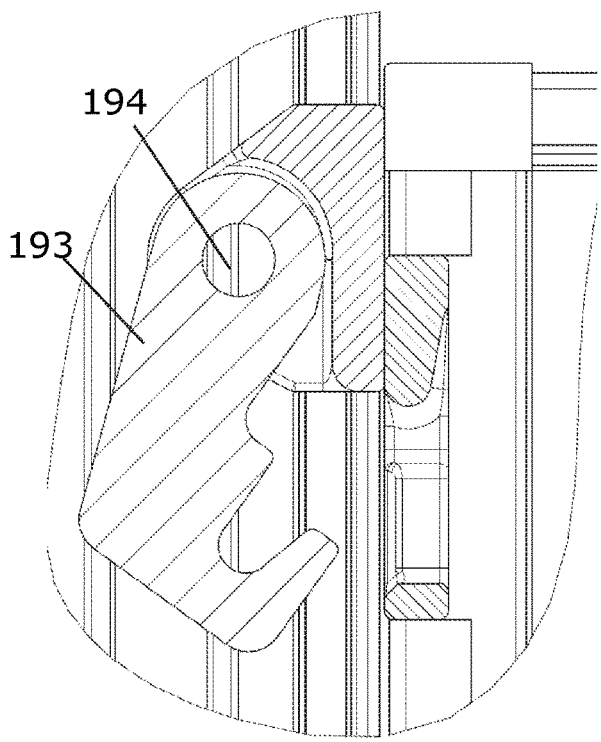
Figure 22:
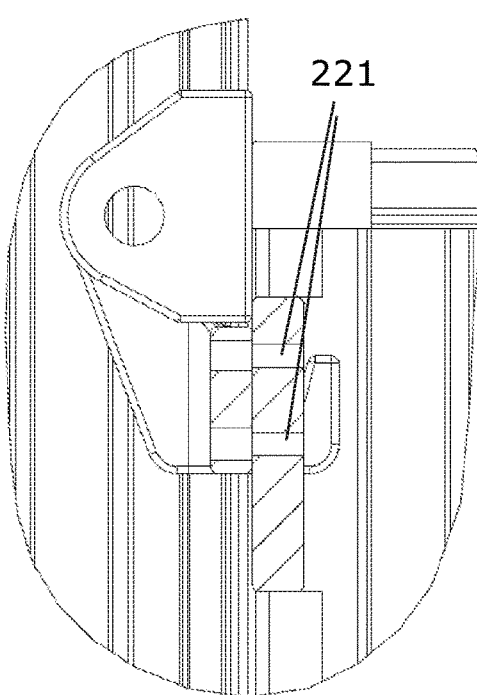
Figure 23:
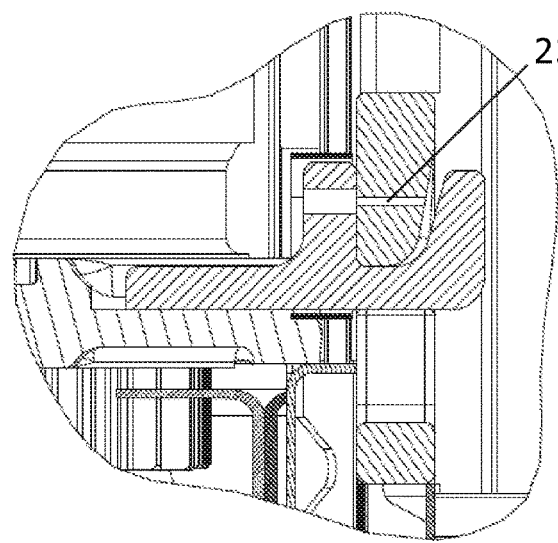
Figure 24:
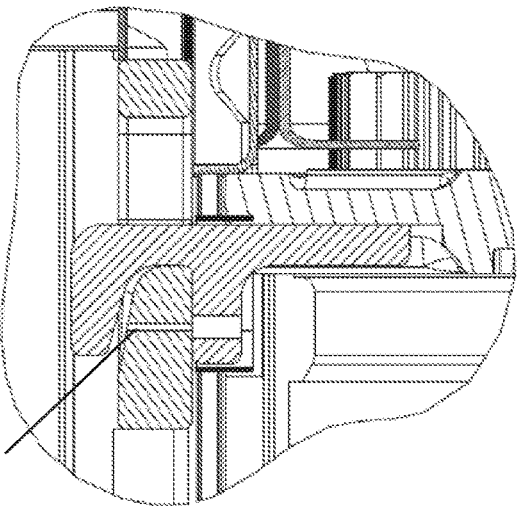
Figure 25A:
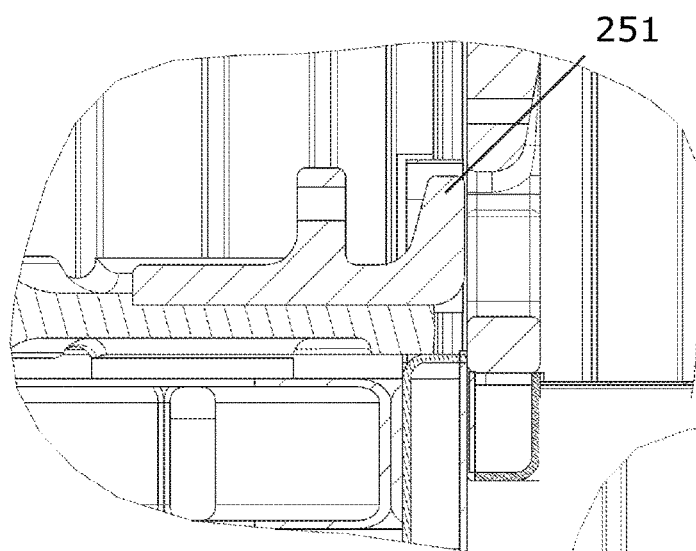
Figure 25B:
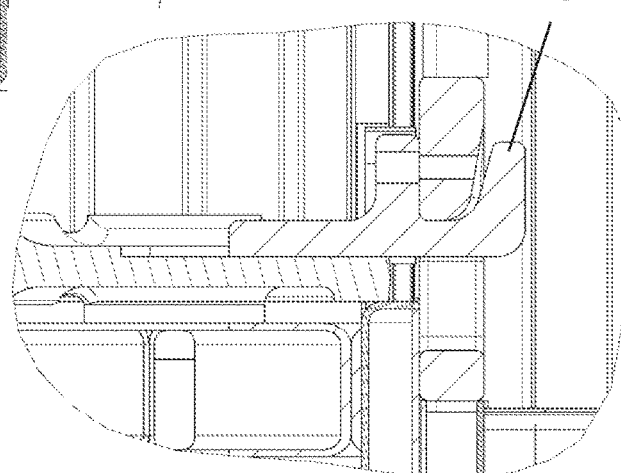
Figure 26:
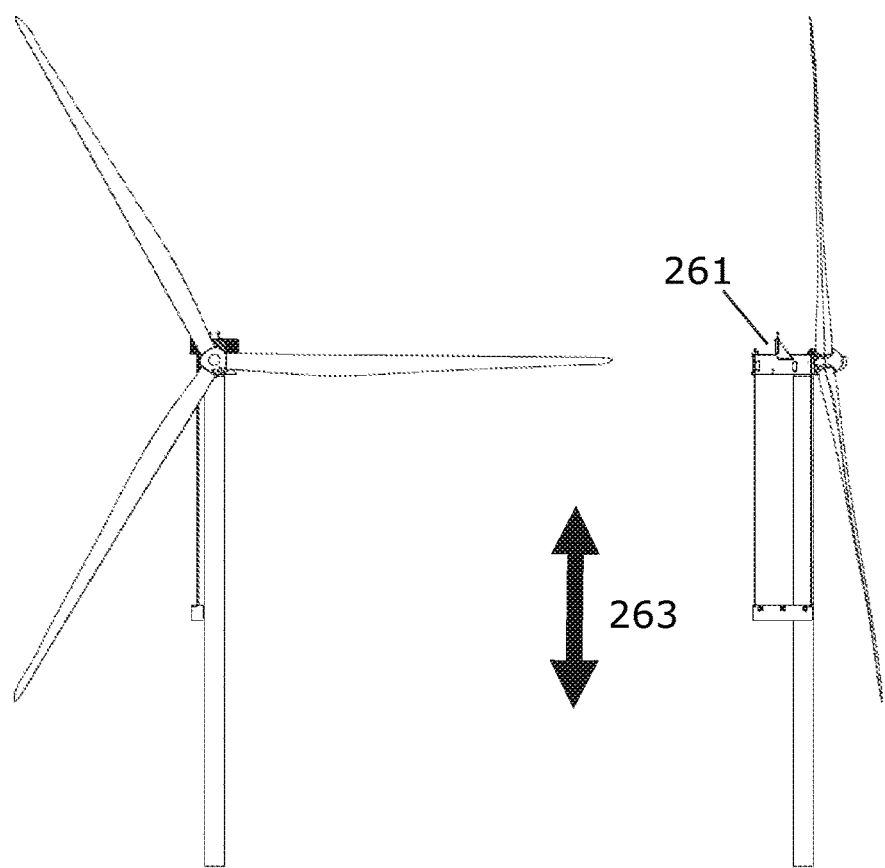
Figure 27:
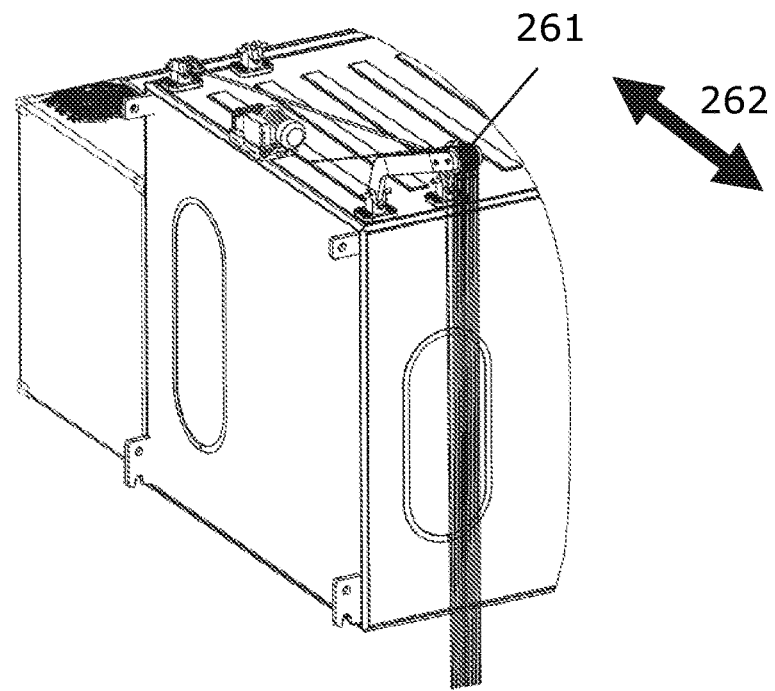
Figure 28:
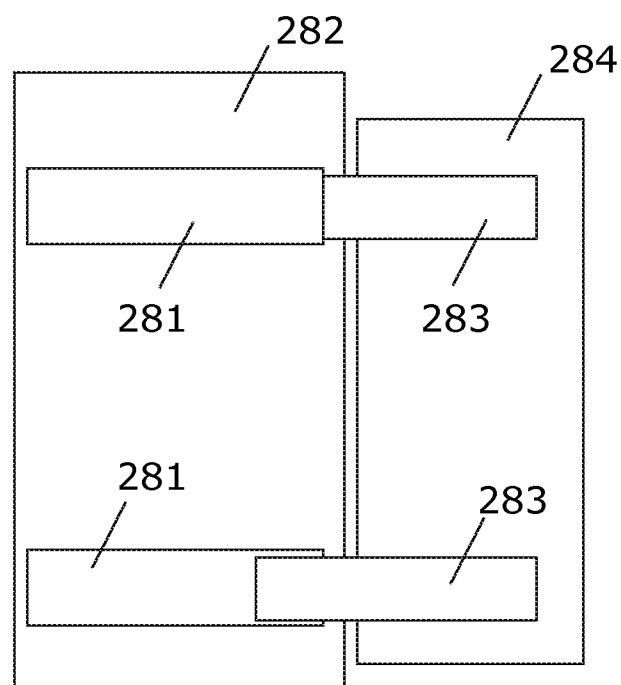

FIGS. 19a, 19b, 19c and, 20 illustrate further details of a hook for attaching the auxiliary unit to the main unit;

FIG. 21 illustrates the hook in an open position where the auxiliary unit is free to be lowered to the ground;

FIG. 22 illustrates a cross section with two bolt holes for attachment of the auxiliary unit on the main unit;

FIGS. 23, 24, 25 illustrate an embodiment where the hook is slidingly suspended; and FIGS. 26-28 illustrate embodiments of cranes on the main unit for hoisting the auxiliary units.

DESCRIPTION OF EMBODIMENTS

The detailed description and specific examples, while indicating embodiments, are given by way of illustration only, since various changes and modifications within the spirit and scope of this disclosure will become apparent to those skilled in the art from this detailed description.

Figure 1A:
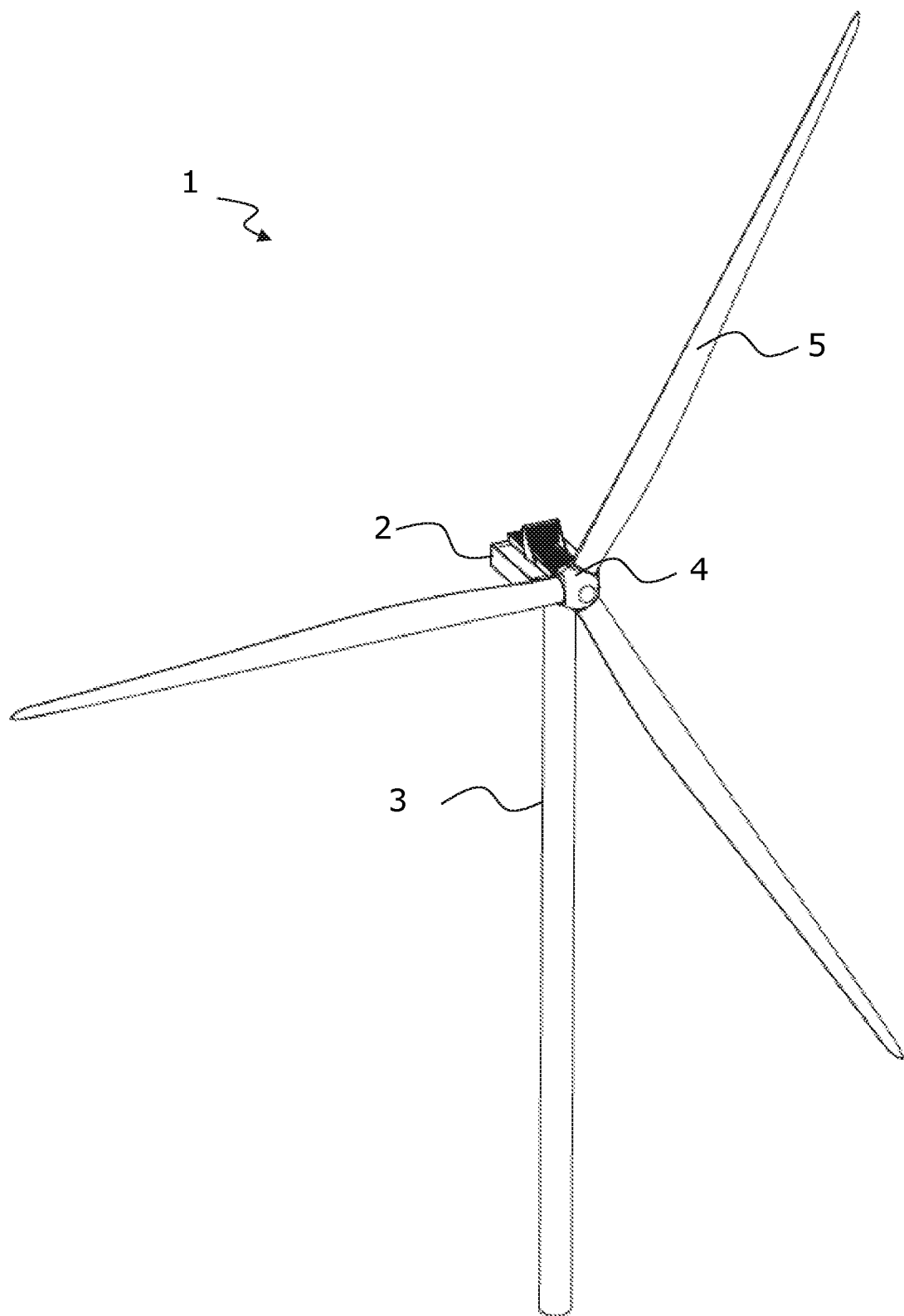
FIGS. 1a and 1b illustrate wind turbines.
Figure 1B:
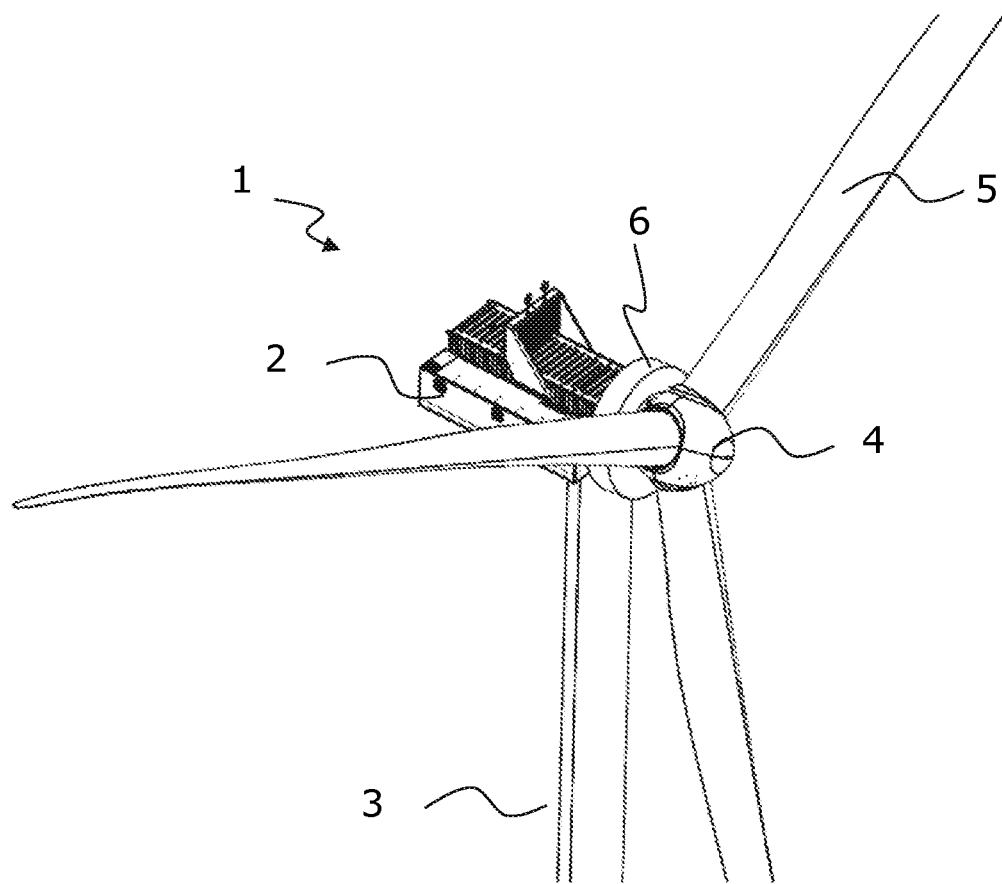

FIGS. 1a and 1b illustrate wind turbines 1 with a nacelle 2 mounted on a tower 3. A hub 4 carrying three rotor blades 5 forms a rotor and is carried by a rotor-supporting assembly in the nacelle 2. Typically, the rotor-supporting assembly comprises a rotor shaft connecting a gear arrangement and a generator to the hub. A gear is, however, not always required since the generator could be directly driven by the shaft. FIG. 1b illustrates a direct drive wind turbine with the generator 6 located outside the nacelle.

Figure 2:
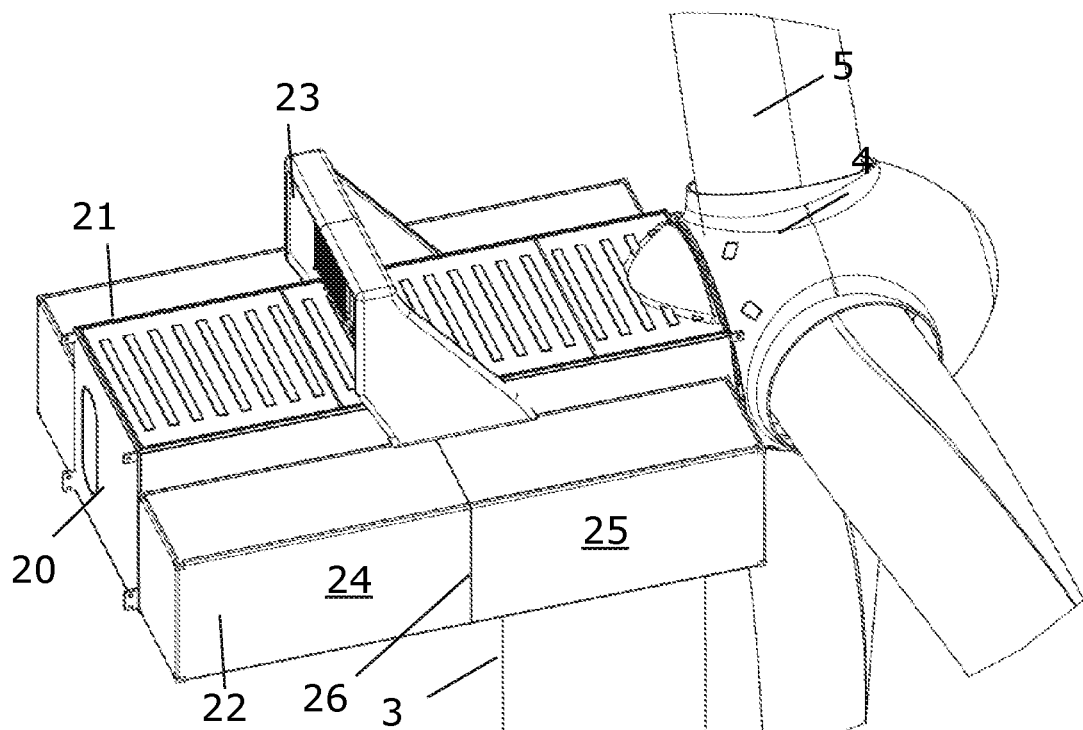
FIG. 2 illustrates the nacelle of the wind turbine.

FIG. 2 illustrates that the nacelle comprises a main unit 20 and two auxiliary units 21, 22. A cooling area 23 is arranged on top of the nacelle. The cooling area is formed by a heat exchanger which may form part of the main unit, and/or any of the auxiliary units. The main unit 20 is mounted on the tower 3 via a yawing arrangement (not shown), allowing the nacelle 2 to rotate in order to direct rotor blades carried by the hub 4 into the wind. Two separate auxiliary units 24, 25 are both joined to the main unit as two separate auxiliary units. Additionally, the auxiliary units could be joined along the additional interface 26 to form the auxiliary unit as one assembled entity.

Figure 3:
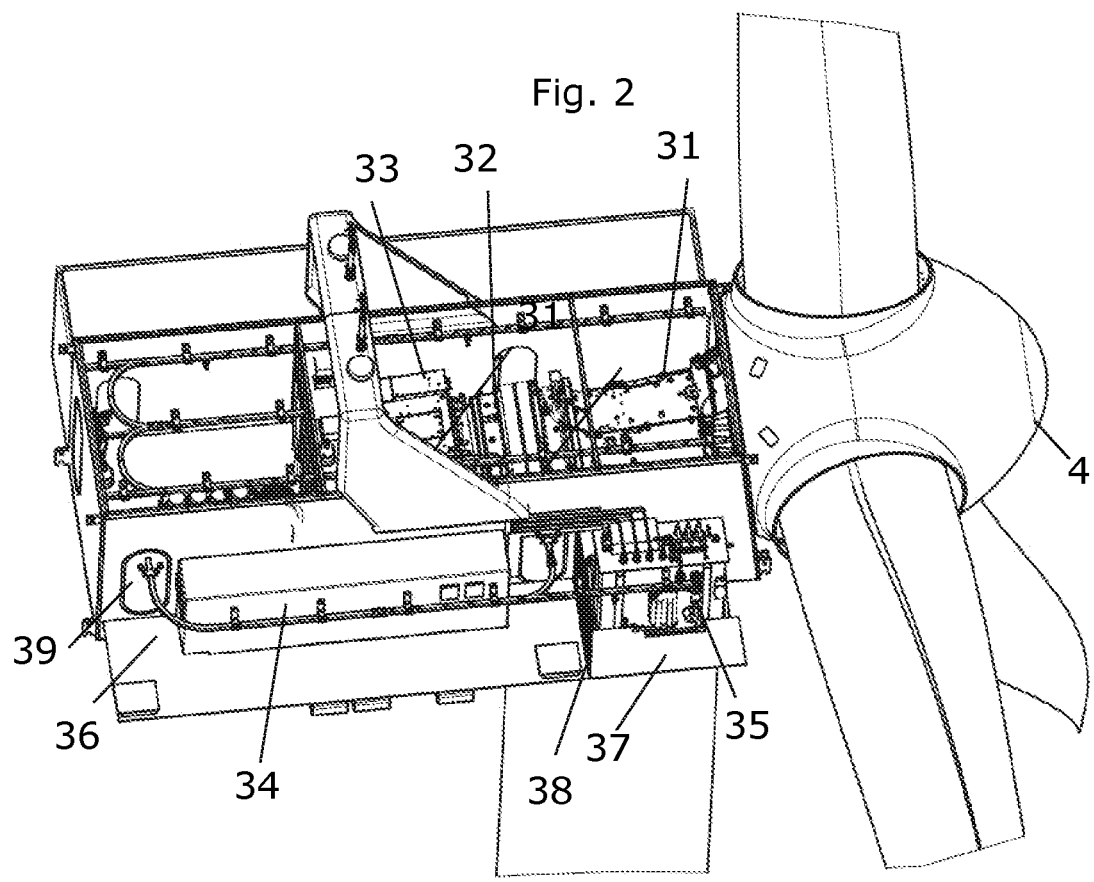
FIG. 3 illustrates a perspective view of the nacelle 2 of FIG. 2.

FIG. 3 illustrates a perspective view of the nacelle 2 of FIG. 2. In FIG. 3 the outer walls of the nacelle 2 are transparent, thereby revealing the interior parts of the nacelle 2 and the wind turbine components accommodated therein. The main unit 20 accommodates a main bearing unit 31, a gear arrangement 32 and a generator 33, arranged sequentially behind the hub 4, along a direction defined by the rotational axis of the hub 4.

The auxiliary unit 21 accommodates a transformer unit 34 in a rearward auxiliary unit 36, and a converter unit 35 in a forward auxiliary unit 37. The division between the auxiliary units is illustrated by the transverse bulkhead 38. The rearward and forward units are separate units which can be separated from each other and which can be separated individually from the main unit.

Each auxiliary unit 21, 22 is mounted along a side of the main unit 20 via a first interface. In the disclosed embodiment, they are mounted in such a manner that one auxiliary unit 21 is mounted along a right side of the main unit 20 and the other auxiliary unit 22 is mounted along a left side of the main unit 20, as seen in a direction along a rotational axis of the hub 4 from the hub 4 towards a rear wall of the main unit 20. The auxiliary units are joined along an additional interface. As illustrated by the bulkhead 38, the second interface may extend perpendicularly to the first interface.

The main unit and the auxiliary units comprise cooperating openings 39 allowing personnel to enter from a main space in the main unit into an auxiliary space in the auxiliary unit. In a similar manner, the auxiliary units may comprise cooperating openings allowing personnel to enter from one auxiliary unit into an adjacent auxiliary unit.

Figure 4:
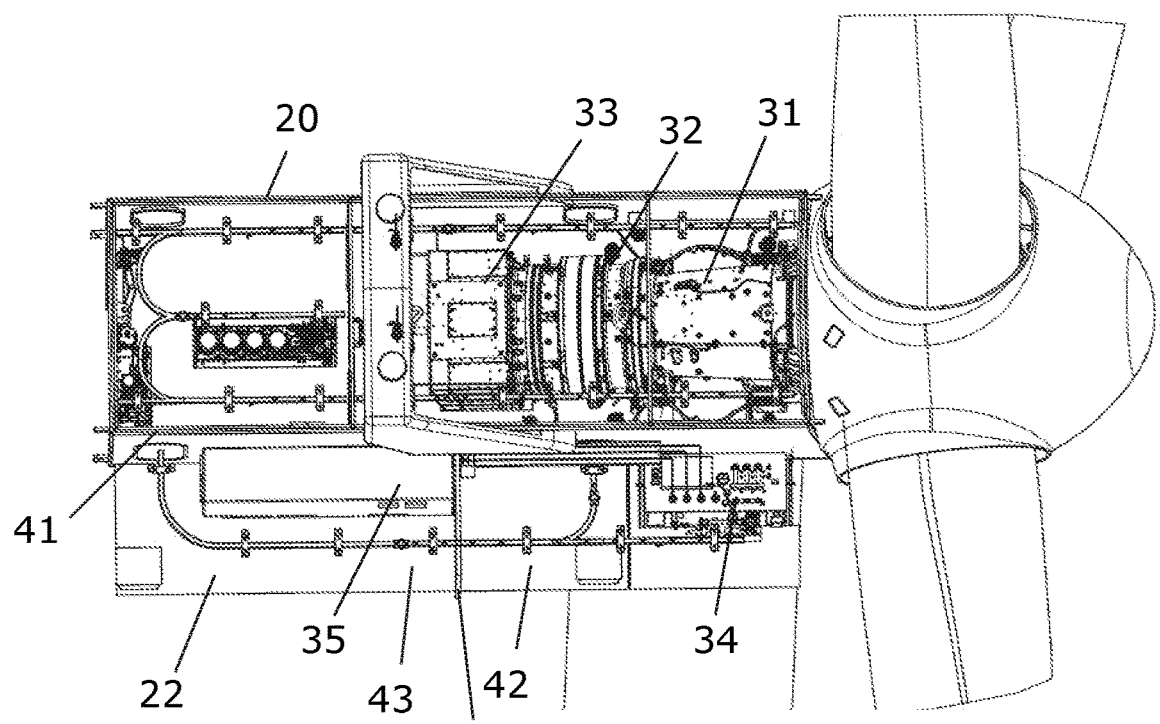
FIG. 4 illustrates the nacelle from FIG. 3 but seen from above.

FIG. 4 illustrates the nacelle from FIG. 3 but seen from above. Both of the auxiliary units 42, 43 of the auxiliary unit 22 have a wall part against the wall of the main unit. The bulkhead 44 is placed between the converter unit 35 and the transformer unit 34 and indicates the second interface and split between two auxiliary units.

Figure 5:
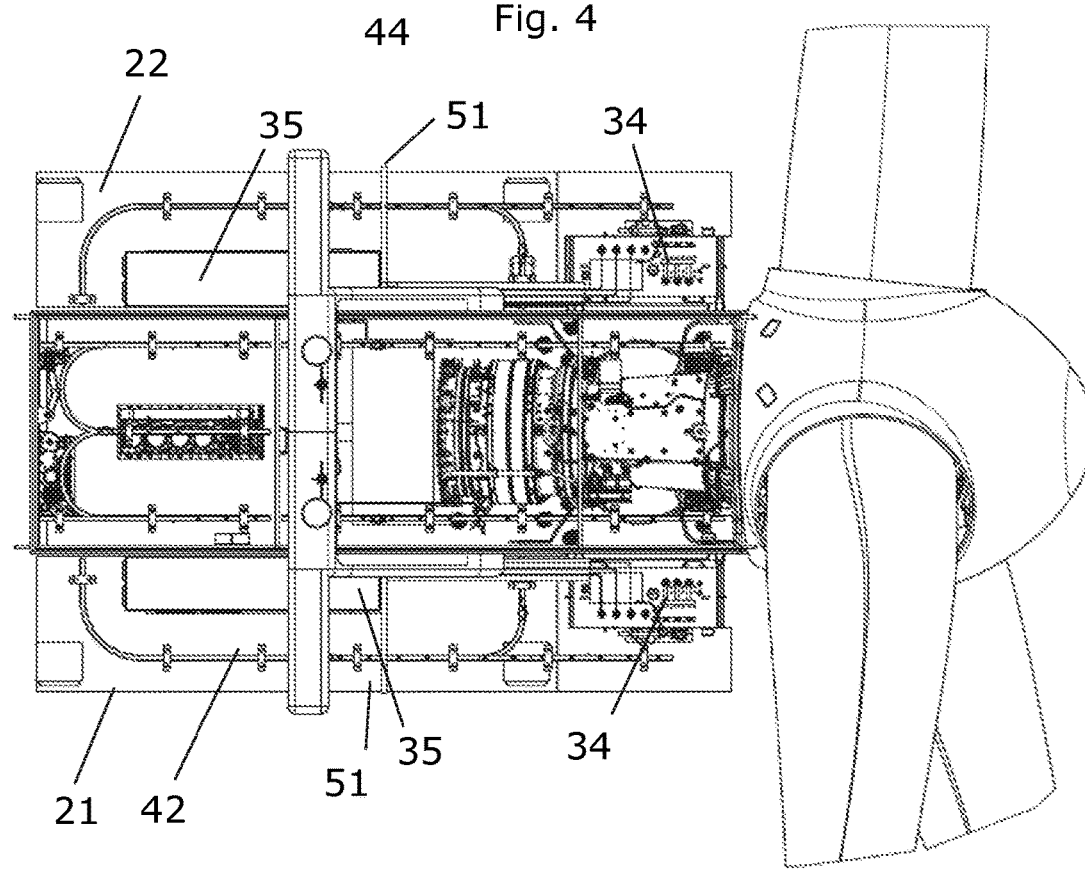
FIG. 5 illustrates an embodiment where the left and right side auxiliary units contain identical components.

FIG. 5 illustrates an embodiment where the left and right side auxiliary units contain at least one identical component establishing a weight balance and a double function. The double function means that the wind turbine comprises two identically functioning components, one contained in each of the auxiliary units. In case of failure, the wind turbine may continue operational on half power while the operative component in one of the auxiliary units is replaced. In FIG. 5 it is further illustrated that two auxiliary units are separated by the bulkheads 51. Accordingly, each of the double functioning components, i.e. the transformer or the converter, may be replaced individually in each of the two auxiliary units.

Figure 6:
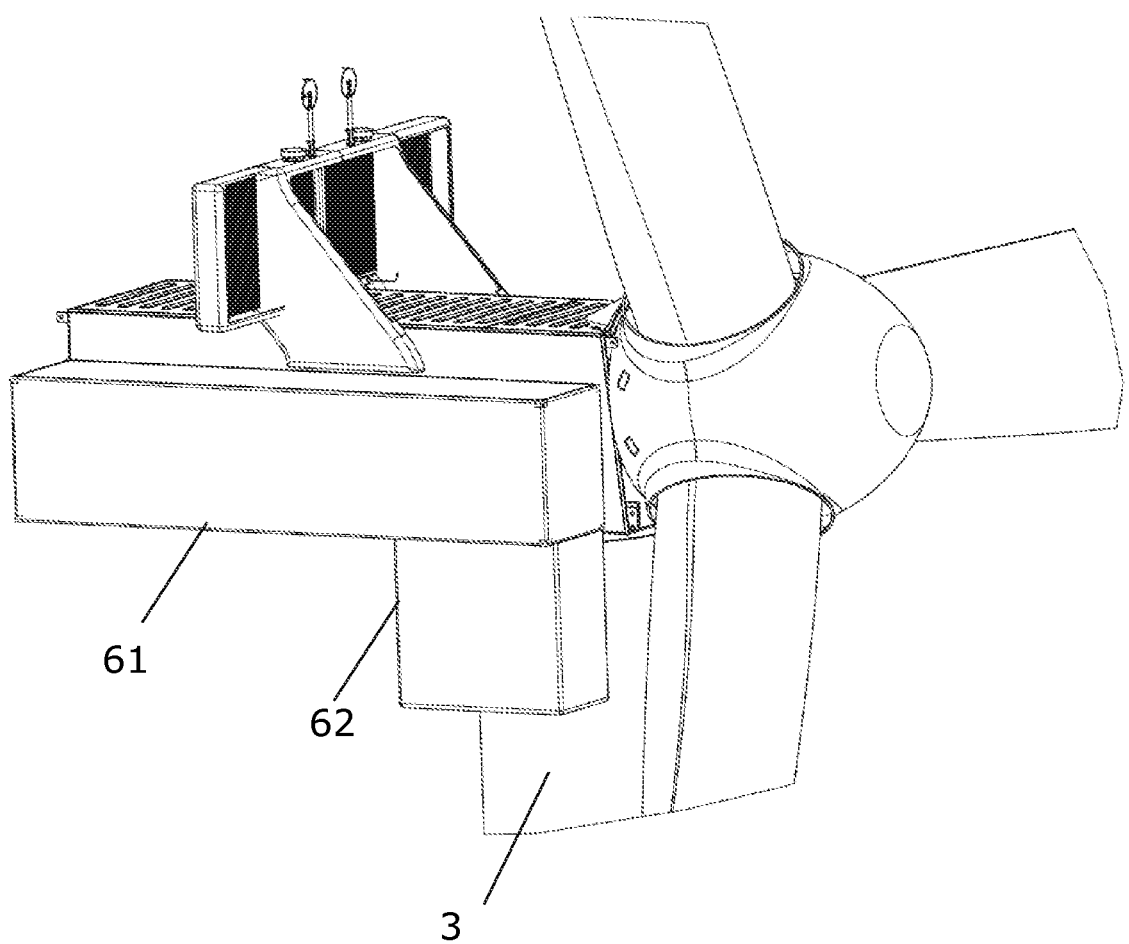
FIG. 6 illustrates an embodiment where two auxiliary units 61, 62 are located one above the other.

FIG. 6 illustrates an embodiment where two auxiliary units 61, 62 are located one above the other. The auxiliary unit 61 is an upper auxiliary unit constituted by a 40 foot container, and the auxiliary unit 62 is a lower auxiliary unit constituted by a 20 foot container.

Figure 7:
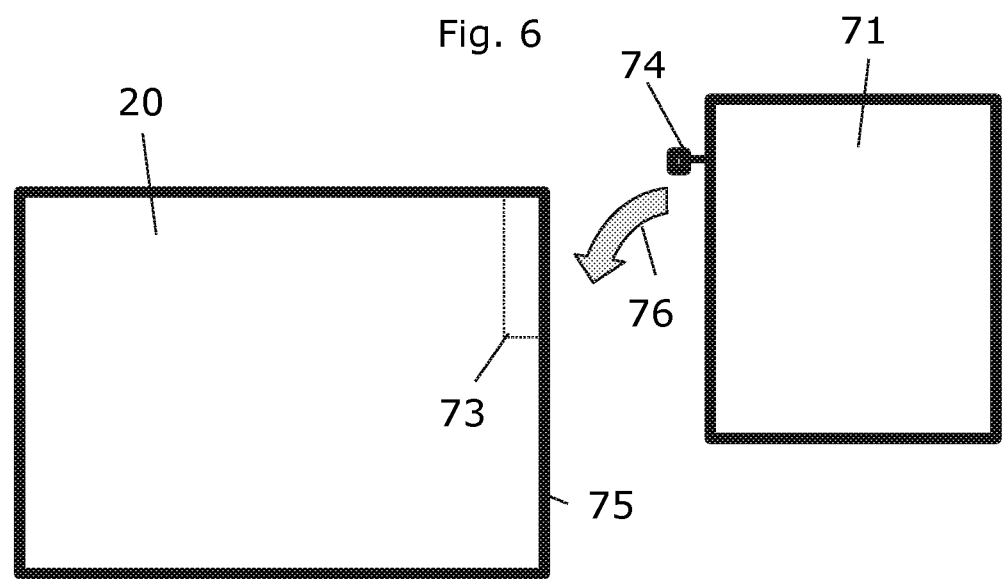
FIG. 7 illustrates schematically details of the interface between the main unit and one of the auxiliary units.

FIG. 7 illustrates details of an embodiment of one of the interfaces. The interface joins the main unit 20 with the auxiliary unit 71 in a releasable manner and allows one auxiliary unit of an auxiliary unit to be replaced e.g. during maintenance. The interface is constituted by an inward track or track 73 in one of the sub-units 72. The track 73 is illustrated with a dotted line and defines a recess into the outer surface 75. The track has a C-shaped profile in a horizontal cross section, i.e. when seen from above. the track is configured to receive the projection 74 provided on the auxiliary unit, and particularly it can receive the projection 74 in a very simple procedure where the auxiliary unit 71 is lowered down along the outer surface 75 of the main unit 20. This is illustrated by the arrow 76. This very simple procedure allows easy replacement of an auxiliary unit without detachment of the other auxiliary unit(s) from the main unit.

Figure 8A:
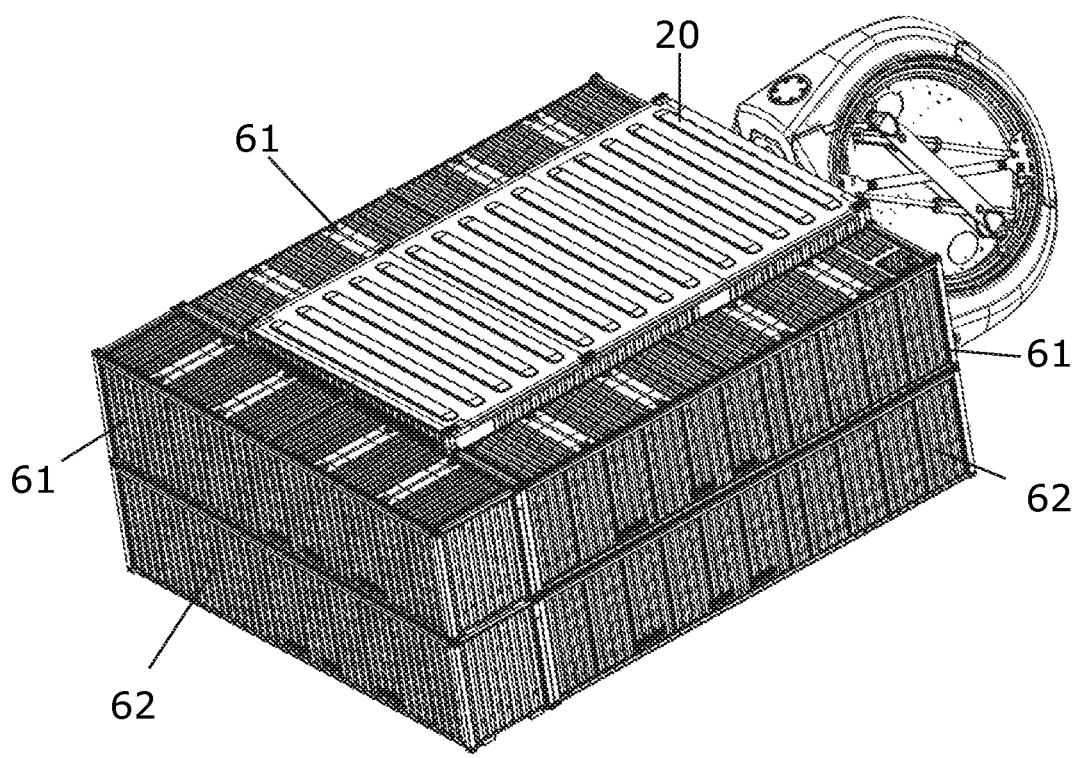
FIGS. 8a and 8b illustrate the main unit and auxiliary unit in an embodiment where the auxiliary units are arranged in a vertical row.
Figure 8B:
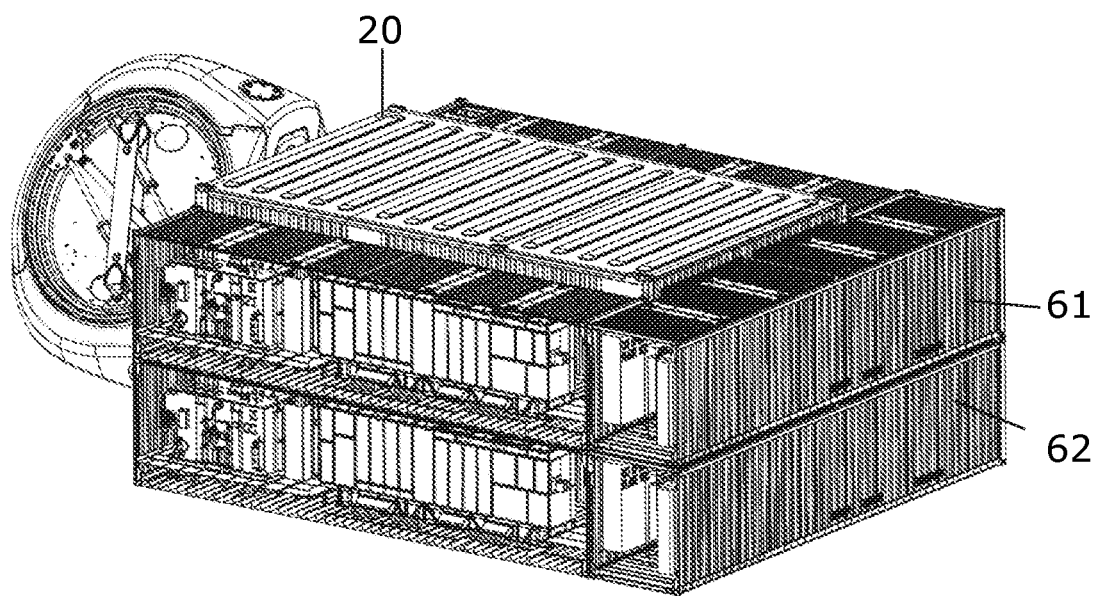

FIGS. 8a and 8b illustrate an embodiment wherein the nacelle comprises a main unit 20 and three sets each constituted by two auxiliary units 61, 62. In the illustrated embodiment, each auxiliary unit is attached directly to the main unit, but they could also be attached to the other auxiliary unit. The upper auxiliary unit 61 and the lower auxiliary unit 62 are identical units aligned in a vertical row. Since the upper unit and the lower unit have identical shapes and sizes when seen in a horizontal cross section, the upper unit forms a roof over the lower unit.

In this embodiment, the auxiliary unit, i.e. the stack of two auxiliary units have nearly the height of the main unit, and both auxiliary units are suspended on the same side wall of the main unit. The auxiliary units are provided on the rear wall of the main unit, and on opposite side walls of the main unit 20.

FIG. 8b illustrates the same nacelle but with sides of the auxiliary units removed to illustrate that the upper unit units 61 like the lower units 62, i.e. they contain the same components, in this case a transformer and converter. The transformer or converter in the upper unit could be identical to the transformer or converter in the lower unit, or they could be different e.g. with respect power rating.

Figure 9A:
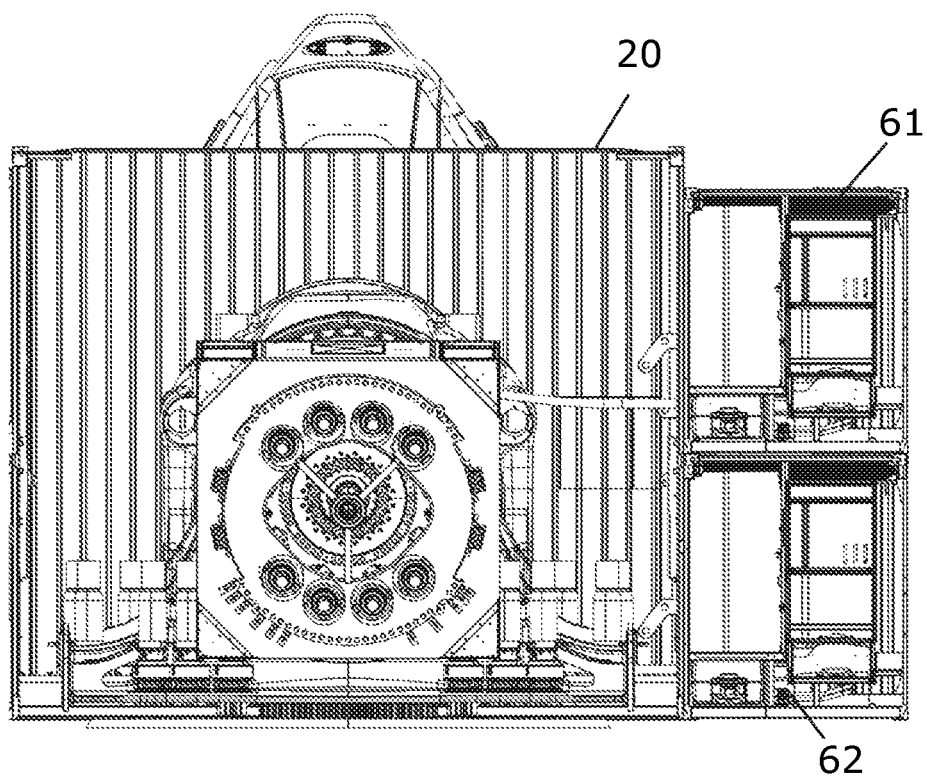
FIGS. 9a and 9b illustrate details of the main and auxiliary units.
Figure 9B:
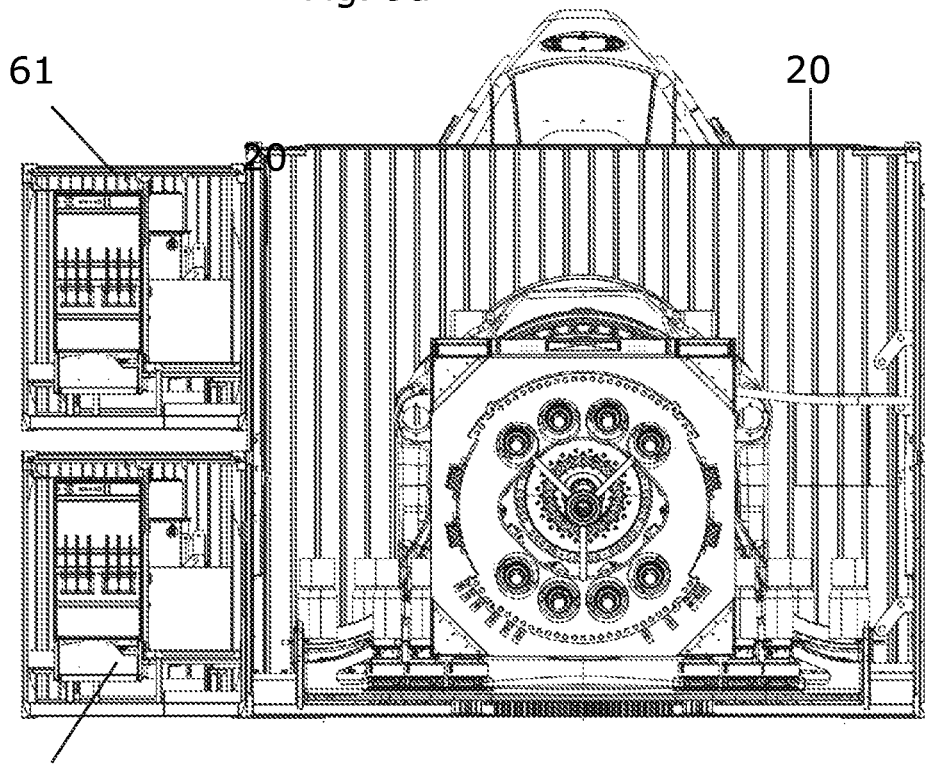

FIGS. 9a and 9b illustrate two different details of the main and auxiliary units. In FIG. 9a, the upper and lower auxiliary units 61, 62 are directly against each other. In this embodiment, load from the upper unit 61 could be transferred to the lower unit 62, and the auxiliary units could be joined to each other by further interfaces.

In FIG. 9b, the upper and lower auxiliary units 61, 62 are arranged with a distance from each other. In this embodiment, load from the upper unit 61 is transferred exclusively to the main unit 20, and the auxiliary units are only joined to the main unit 20.

Figure 10:
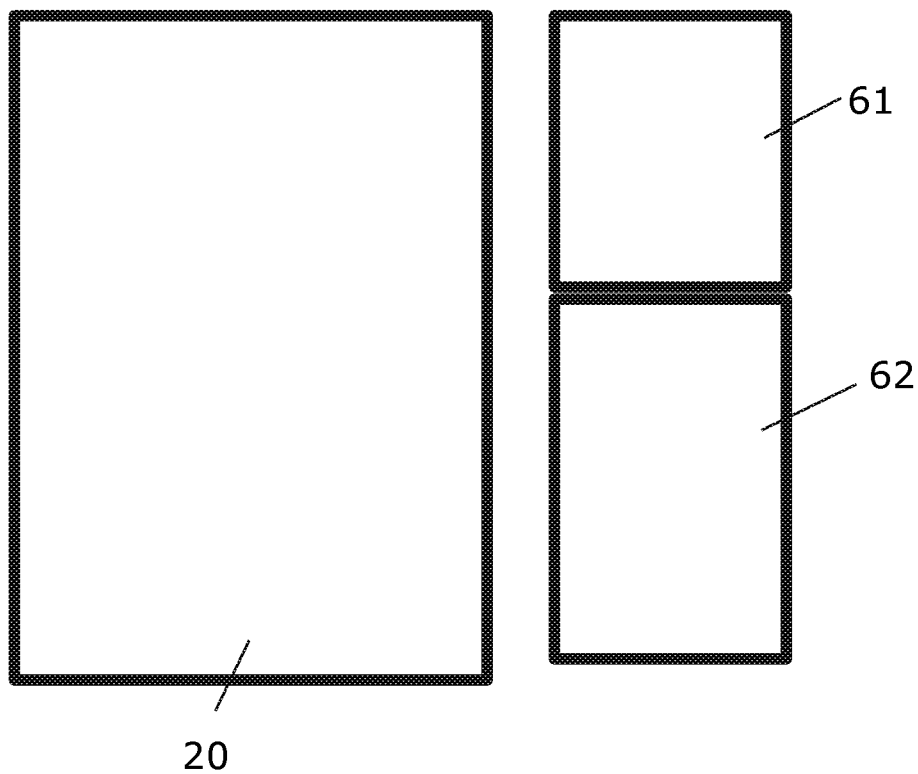
FIGS. 10-11 illustrate details of different layouts with a gap between the units.
Figure 11:
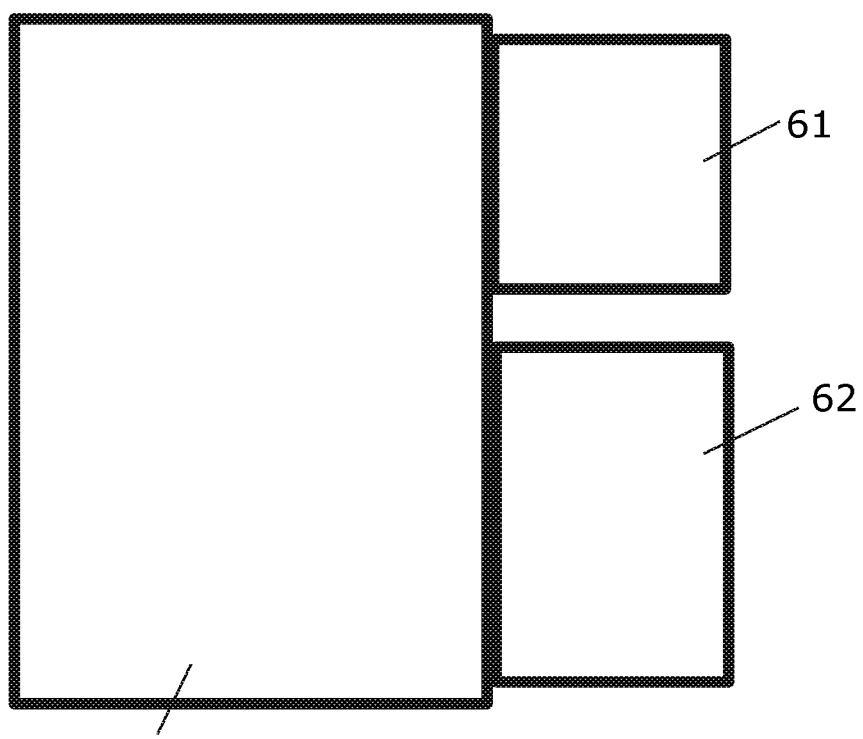

FIGS. 10-11 illustrate different layouts provided by the first and second interfaces respectively.

In FIG. 10, the first interface provides a gap between the main unit and the auxiliary unit. This gap allows air to pass between the main and auxiliary units and thereby supports efficient cooling by convection. Additionally, the gap increases safety e.g. by preventing fire to spread.

In FIG. 11, a gap is defined between the auxiliary unit. Again, the gap allows air to pass between the auxiliary units and thereby supports efficient cooling by convection and increases safety.

FIGS. 12-15 illustrate four different embodiments of a unit fixation structure forming part of one of the interfaces between an auxiliary unit and the main unit or between two auxiliary units. In each of these four illustrations, the auxiliary unit, 121 and the main unit 122 are connected by cooperating structures described below. The same structure may apply for joining two auxiliary units.

Figure 12:
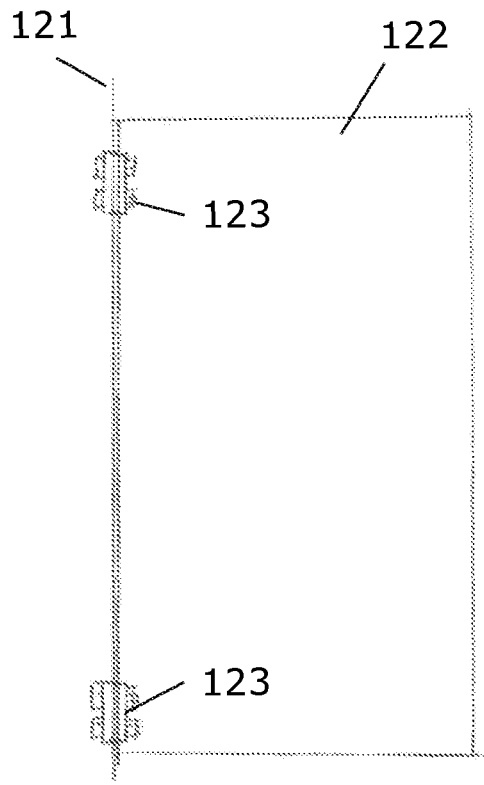
FIGS. 12-15 illustrate 4 different embodiments of interfaces between the main unit and the auxiliary unit.

In FIG. 12, the cooperating structures are constituted by brackets 123 by which the units are joined by bolts.

Figure 13:
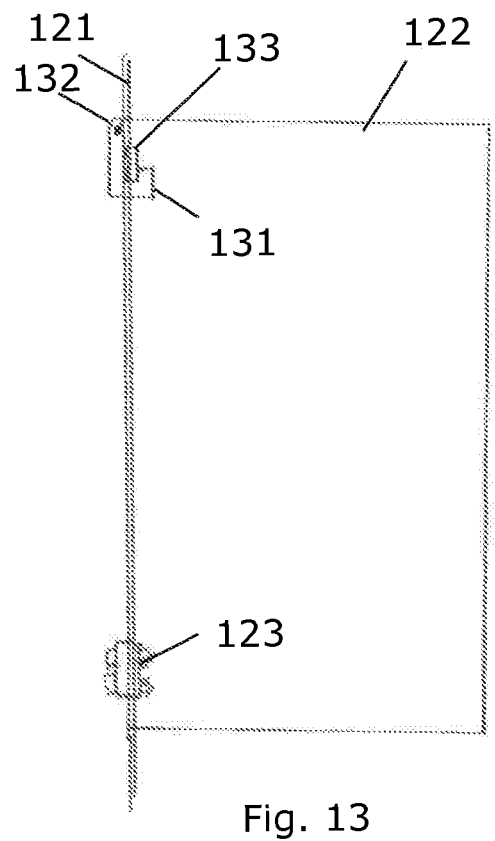

In FIG. 13, the cooperating structures are constituted by a lower bracket 123 similar to the one used in FIG. 12. At the upper edge, the units are assembled by a hook 131 pivotally joined to the first auxiliary unit at the hinge point 132. The hook can rotate as indicated by the arrow 133 and engages the edge-bracket 134 of the unit when in the illustrated position. When the lower bracket 123 is removed, and the hook 131 is rotated into the unit, the second auxiliary unit can be lowered to the ground.

Figure 14:
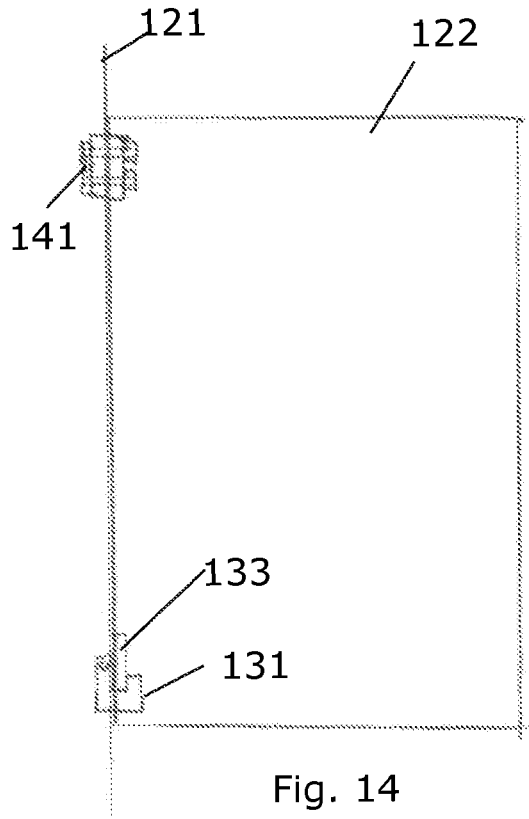

The embodiment in FIG. 14 is comparable to the embodiment in FIG. 13, but where the lower bracket is replaced with an upper bracket 141, and the hook is placed at a lower edge.

Figure 15:
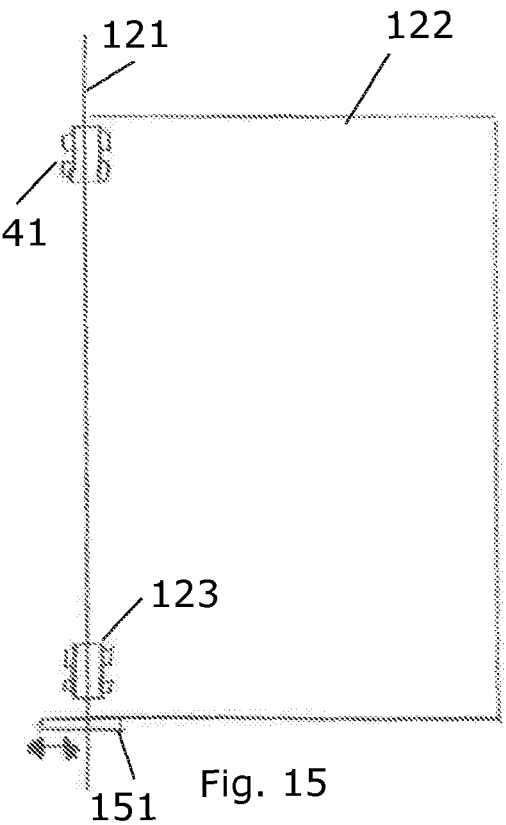

In FIG. 15, a lower and an upper bracket is used for bolting the auxiliary unit to the main unit, and a slidable support 151 supports the lower surface of the second auxiliary unit while the bolts are attached. If it is desired to lower the second unit to the ground, e.g. for replacement or maintenance of the operative component, the slidable support can be slided to the left and the auxiliary unit can be lowered, e.g. by use of a crane build into the first auxiliary unit. In any of the embodiments shown in FIGS. 12-15, the brackets or hooks direct the load from the auxiliary unit into a rigid part of the main unit, e.g. into load carrying column e.g. a corner column of the main unit. Various structural features may connect the brackets or hooks which carry the auxiliary unit directly to the main frame in the main unit to thereby establish a load path into the tower.

Figure 16:
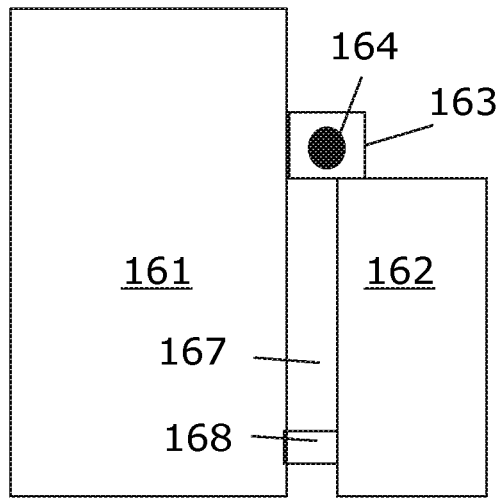
FIGS. 16-18 illustrate an embodiment where the main unit and auxiliary units are assembled by a hinge structure.
Figure 17:
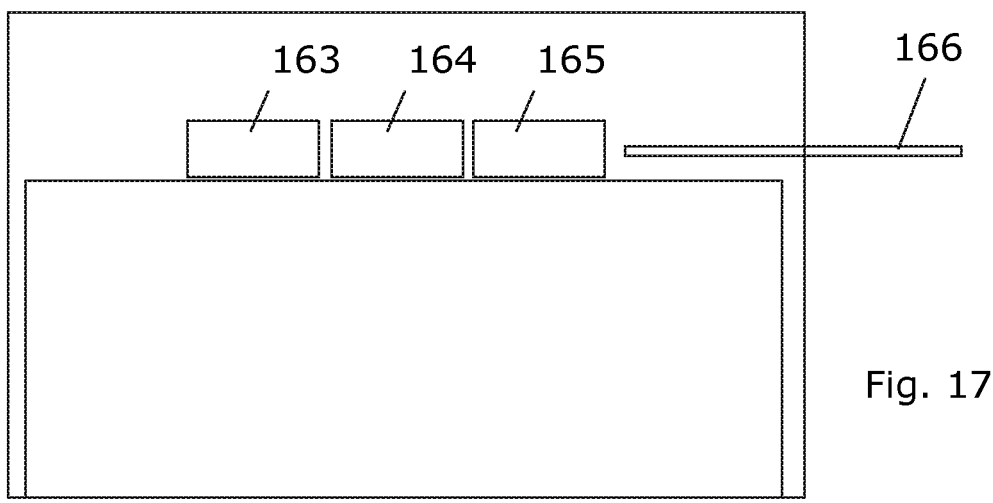
Figure 18:
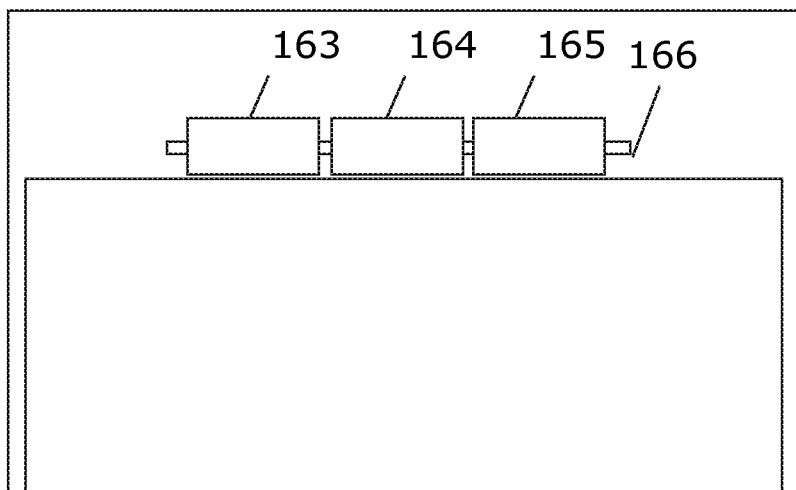

FIGS. 16-18 illustrate an embodiment where the auxiliary unit and the main unit are assembled by a hinge structure comprising hinge elements 163, 164, 165 with a hole for receiving a hinge pin 166 extending through the hinge elements. FIG. 16 further shows that the interface forms a gap 167 allowing air to pass e.g. from beneath the nacelle to above the nacelle, through the gap. The gab is held open at the bottom by the distance element 168, which could be constituted by a number of pins or an open structure allowing air to pass between the units.

Such a gap may increase thermal convection and thus cooling of the space inside the units. The gap is not limited to the embodiment with the hinge structure but could be combined with any other assembly method.

FIGS. 17 and 18 illustrate the hinge elements 163, 164, 165 and the hinge pin 166. In FIG. 17, the hinge elements are positioned correctly relative to the each other such that the hinge pin can be slided into the hinge elements. In FIG. 18, the hinge pin is inserted through the holes of the hinge elements.

FIGS. 19a, 19b, and 19c illustrate further details of a hook for attaching the one unit 191 to another unit 192, e.g. an auxiliary unit to the main unit or an auxiliary unit to another auxiliary unit—herein just referred to as first and second units. The hook 193 is suspended rotationally at the hinge 194 in the first unit and catches a recess or edge 195 in the second unit.

Figure 20:
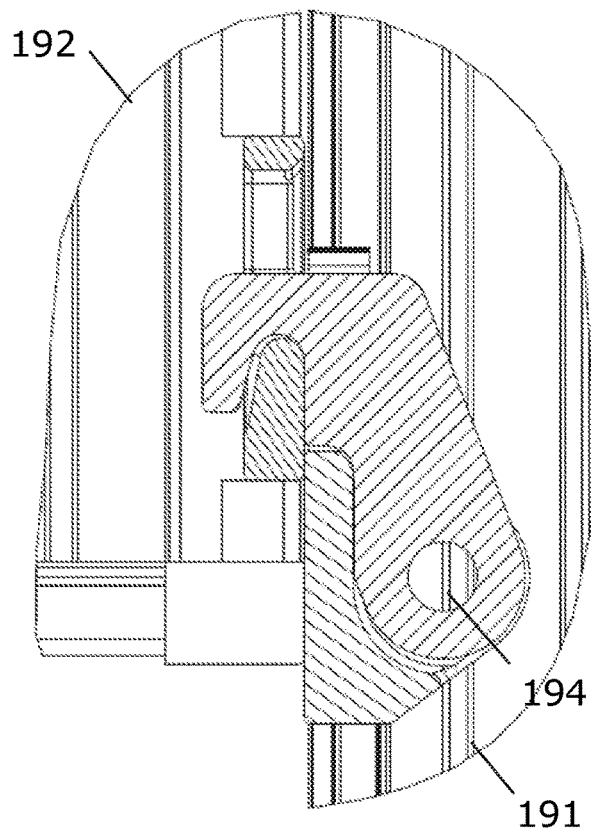

The hook could also be attached in the second unit and catch a recess or edge in the first unit, in which case it may be attached reversely, i.e. as illustrated in FIG. 20. The hook may be positioned by use of an actuator.

FIG. 21 illustrates the hook in an open position where the second unit is free to be lowered to the ground.

FIG. 22 illustrates a cross section where two bolt holes 221 can be seen. The bolt holes facilitate attachment of the second unit on the first unit by use of bolts for solid fixation. In this embodiment, the hook is mainly for positioning the second unit in the correct height relative to the first unit, and the bolts are for joining the units.

In FIGS. 19, 21 and 22, the hook is preferably supported by a rigid frame structure, e.g. via column or support posts arranged along an inner surface of the unit which holds the hook. In FIG. 19, the column 197 extends along an inner surface of the unit and supports the hook on the main frame in the bottom part of the unit.

The hook could be moved between the open position (FIG. 21) and the closed position (FIG. 19, 20, 22) by power driven means, e.g. including a hydraulically driven actuator.

FIGS. 23, 24, 25 illustrate an embodiment where the hook is not rotationally suspended but slidingly suspended. The function is like the embodiment of FIGS. 19-22. In FIGS. 23 and 24, a cross sectional view illustrates a bolt hole 231 which can be used for solid, bolted joining of the units.

In FIG. 25a, the hook 251 is slided to the left thereby disengaging the edge of the unit and allowing the unit to be lowered to the ground. In FIG. 25b, the hook 251 is slided to the right, thereby engaging the edge of the auxiliary unit and holding the two units fixed to each other. The hook may be slided by power driven means, e.g. by a hydraulic actuator.

In the description above, FIGS. 19-25 are explained as parts of the unit fixation structure for joining the units.

FIG. 26 illustrates hoisting a unit up or down during maintenance or replacement. The unit is hoisted by use of a crane 261 forming part of the main unit or forming part of one of the auxiliary units. Movement is essentially only in the vertical plane, illustrated by the arrow 263, and the attachment of the auxiliary unit or one of the auxiliary units may be facilitated by a unit fixation structure as described previously, including movable fixation features such as hinged or slidable hooks etc.

FIG. 27 illustrates the internal crane 261 in an enlarged view. The crane is attached to a roof part of the main unit or one of the auxiliary units and by its location, it can hoist other units in a vertical direction to a position where said unit fixation structures can form engagement between the units. This procedure may not require movement in other directions than the vertical direction and therefore facilitates a simple assembly procedure with reduced need for external crane assistance. For adjustment in a horizontal plane, the crane 261 may have the option of moving horizontally, e.g. as illustrated by the arrow 262.

FIG. 28 illustrates schematically, another crane structure with a double cantilever beam 281 on the roof of the main unit 282 or on the roof of one of the auxiliary units. The cantilever beam 281 can extend sideways in telescopic section 283. The cantilever beam facilitates lifting and connection of another unit 284. Even though the unit fixation structures disclosed herein, including pivotable or slidable hooks, generally facilitate attachment of the auxiliary unit or auxiliary unit by hoisting only in the vertical direction, the in and out movement facilitates fine adjustment of a horizontal distance between the main unit and the auxiliary unit.

DEFINITIONS

Herein, the term "nacelle" means the generally accepted term describing the machine house for a wind turbine, i.e. that part which carries the rotor and drivetrain, and which is carried by the wind turbine tower.

The terms "main unit" and "auxiliary unit" herein refers to units which can be transported separately, and which can be assembled with one or more other units to form the nacelle.

Herein, the term "rotor-supporting assembly" refers to those parts of the nacelle which carries the rotor, typically a drivetrain, a main bearing and a main frame. The drivetrain may include different components depending on the type of wind turbine, e.g. a rotor shaft, the generator, and optionally a gearbox between the rotor shaft and the generator.

The invention claimed is:

1. A wind turbine nacelle configured for mounting on a wind turbine tower and housing a rotor-supporting assembly defining a rotational axis, the nacelle comprising:
   a main unit arranged to be connected to the wind turbine tower and housing the rotor-supporting assembly, the main unit comprising:
      a first side wall and a second side wall on opposite sides of the rotational axis, and
      a rear wall extending transverse to the rotational axis between the side walls, and
   a plurality of auxiliary units, at least some of the plurality of auxiliary units being arranged along the rear wall and at least one of the first side wall and the second side wall of the main unit,
   wherein:
   the main unit and a first of the plurality of auxiliary units are assembled at a first interface,
   the main unit and a second of the plurality of auxiliary units are assembled at a second interface, and
   both the first and the second interfaces are in a first wall being one of the first side wall, the second side wall, or the rear wall.

2. The nacelle according to claim 1, wherein:
   the main unit and a third of the plurality of auxiliary units are assembled at a third interface,
   the main unit and a fourth of the plurality of auxiliary units are assembled at a fourth interface, and
   both the third and the fourth interfaces are in a second wall being one of the first side wall, the second side wall, or the rear wall.

3. The nacelle according to claim 2, wherein:
   the main unit and a fifth of the plurality of auxiliary units are assembled at a fifth interface,
   the main unit and a sixth of the plurality of auxiliary units are assembled at a sixth interface, and
   both the fifth and the sixth interfaces are in a third wall being one of the first side wall, the second side wall, or the rear wall.

4. The nacelle according to claim 3, wherein the first wall is the first side wall, the second wall is the second side wall, and the third wall is the rear wall.

5. The nacelle according to claim 2, wherein:
   the first auxiliary unit and a seventh of the plurality of auxiliary units are assembled at a seventh interface,
   the second auxiliary unit and an eighth of the plurality of auxiliary units are assembled at an eighth interface,
   the third auxiliary unit and the seventh auxiliary units are assembled at a ninth interface, and
   the fourth auxiliary unit and the eighth auxiliary units are assembled at a tenth interface, and
   the first wall being the first side wall, the second wall being the second side wall, and both the seventh auxiliary unit and the eighth auxiliary unit extending along the rear wall.

6. The nacelle according to claim 5, wherein the main unit and the seventh auxiliary unit are assembled at an eleventh interface, and
the main unit and the eighth auxiliary unit are assembled at a twelfth interface.

7. The nacelle according to claim 1, wherein at least one of the first, third, fifth, and seventh auxiliary units forms an upper unit and at least one of the second, fourth, sixth, and eighth auxiliary units forms a lower unit arranged below the upper unit and aligned therewith in a vertical row.

8. The nacelle according to claim 7, wherein the lower unit and the upper unit have substantially the same shapes and/or sizes when seen in a horizontal cross section.

9. The nacelle according to claim 7, wherein the upper unit and the lower unit have a total height which is between 80 and 120 percent of a height of the main unit.

10. The nacelle according to claim 1, wherein a gap is defined between at least one of:
    the main unit and at least one of the plurality of auxiliary units, and
    two adjacent auxiliary units of the plurality of auxiliary units,
    said gap allowing air to respectively pass between the at least one of the main and auxiliary units and the two adjacent auxiliary units.

11. The nacelle according to claim 10, wherein the gap is defined both between:
    the main unit and the at least one of the plurality of auxiliary units, and
    the two adjacent auxiliary units of the plurality of auxiliary units.

12. The nacelle according to claim 11, wherein the gap between the two adjacent auxiliary units and the gap between the at least one of the plurality of auxiliary unit and the main unit are interconnected.

13. The nacelle according to claim 1, comprising an entrance from the main unit to at least one of the plurality of auxiliary units.

14. The nacelle according to claim 1, comprising an entrance from one of the plurality of auxiliary units to another of the plurality of auxiliary units.

15. The nacelle according to claim 13, comprising a gasket sealingly engaging at least one of:
    two adjacent auxiliary units of the plurality of auxiliary units, and
    at least one of the plurality of auxiliary units and the main unit to form a sealing engagement between the engaged parts.

16. The nacelle according to claim 1, wherein each of the plurality of auxiliary units forms a space which can be separated air-tightly from a space in the main unit.

17. The nacelle according to claim 1, wherein at least one of the plurality of auxiliary units has the size or shape of a shipping container of 10, 20, 40 or 45 foot size.

18. A wind turbine comprising a nacelle according to claim 1.

19. A method of making a nacelle for a wind turbine, the method comprising:
    receiving a plurality of wind turbine components being encapsulated in a plurality of auxiliary units, and
    attaching the plurality of auxiliary units with the encapsulated components to a main unit of the nacelle,
    wherein at least some of the plurality of auxiliary units are arranged along a rear wall and at least one of a first side wall and a second side wall of the main unit.

20. The method according to claim 19, wherein the main unit is attached to a wind turbine tower, and wherein the plurality of wind turbine components remain encapsulated in the plurality of auxiliary units until the main unit is attached to the tower.

21. The method according to claim 19, wherein the plurality of auxiliary units are arranged to hermetically isolate one of the plurality of wind turbine components from another one of the plurality of wind turbine components.

22. The method according to claim 19, wherein one of the plurality of auxiliary units is released from another of the plurality of auxiliary units and from the main unit in response to an incident.

\* \* \* \* \*